US012596183B2

(12) United States Patent
Miyanohara et al.

(10) Patent No.: US 12,596,183 B2
(45) Date of Patent: Apr. 7, 2026

(54) SENSING DEVICE AND ELECTRONIC DEVICE

(71) Applicant: SONY SEMICONDUCTOR SOLUTIONS CORPORATION, Kanagawa (JP)

(72) Inventors: Akihiko Miyanohara, Kanagawa (JP); Hiroki Hiyama, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 798 days.

(21) Appl. No.: 17/906,665

(22) PCT Filed: Dec. 21, 2020

(86) PCT No.: PCT/JP2020/047638
§ 371 (c)(1),
(2) Date: Sep. 19, 2022

(87) PCT Pub. No.: WO2021/192460
PCT Pub. Date: Sep. 30, 2021

(65) Prior Publication Data
US 2023/0124216 A1 Apr. 20, 2023

(30) Foreign Application Priority Data
Mar. 27, 2020 (JP) ................................. 2020-056938

(51) Int. Cl.
*G01S 7/4863* (2020.01)
*G01S 7/4865* (2020.01)
*G01S 17/894* (2020.01)
(52) U.S. Cl.
CPC .......... *G01S 7/4863* (2013.01); *G01S 7/4865* (2013.01); *G01S 17/894* (2020.01)

(58) Field of Classification Search
CPC .... G01S 7/4863; G01S 7/4865; G01S 17/894; G01S 7/4868; H10F 30/20; H10F 30/225; H04N 25/70
See application file for complete search history.

(56) References Cited

U.S. PATENT DOCUMENTS

| | | | |
|---|---|---|---|
| 11,402,263 B2 * | 8/2022 | Dutton | H10F 77/959 |
| 11,513,002 B2 * | 11/2022 | Sonobe | G01J 1/0252 |

(Continued)

FOREIGN PATENT DOCUMENTS

| | | |
|---|---|---|
| CN | 101387658 A | 3/2009 |
| CN | 104023184 A | 9/2014 |

(Continued)

OTHER PUBLICATIONS

English Translation Description JP2018157032A.*

(Continued)

*Primary Examiner* — Assres H Woldemaryam
(74) *Attorney, Agent, or Firm* — CHIP LAW GROUP

(57) ABSTRACT

In a sensing device that generates a distance image, a variation in distance measurement accuracy in the distance image is reduced. The sensing device includes a predetermined number of pixel circuits and a voltage control unit. Each of the predetermined number of pixel circuits includes a photoelectric conversion element and a detection circuit. A predetermined reverse bias voltage is applied between an anode and a cathode of the photoelectric conversion element. The detection circuit detects whether a photon is present or absent on the basis of a potential of either the anode or the cathode. The voltage control unit adjusts the reverse bias voltage to a value corresponding to a breakdown voltage of the photoelectric conversion element for each of the pixel circuits.

14 Claims, 39 Drawing Sheets

(56) References Cited

U.S. PATENT DOCUMENTS

| | | | | |
|---|---|---|---|---|
| 11,728,621 | B2 * | 8/2023 | Moore | H01S 5/0427 |
| | | | | 372/50.124 |
| 2018/0180470 | A1 | 6/2018 | Seitz | |
| 2018/0180473 | A1 * | 6/2018 | Clemens | G01S 7/497 |
| 2018/0266881 | A1 * | 9/2018 | Fujiwara | H10F 39/103 |
| 2019/0189827 | A1 | 6/2019 | Haraguchi | |
| 2020/0011732 | A1 * | 1/2020 | Dutton | H10F 77/95 |
| 2020/0044098 | A1 | 2/2020 | Azuma | |

FOREIGN PATENT DOCUMENTS

| | | | | |
|---|---|---|---|---|
| CN | 106898675 | A | | 6/2017 |
| CN | 110012244 | A | | 7/2019 |
| JP | 2018157032 | A | * 10/2018 | G01J 1/44 |
| JP | 2019-075394 | A | | 5/2019 |
| JP | 2020-034523 | A | | 3/2020 |
| JP | 2020-048019 | A | | 3/2020 |

OTHER PUBLICATIONS

Yan Peiqin, et al, "Si-APD Single-Photon Detector with High Stability Based on Auto-Compensation of Temperature Drift", Laser & Optoelectronics Progress, 080403, Aug. 10, 2017, pp. 080403-1-080403-7.

International Search Report and Written Opinion of PCT Application No. PCT/JP2020/047638, issued on Mar. 16, 2021, 09 pages of ISRWO.

Zhang Sheng-Cai, et al, "Analysis of Fixed Pattern Noise in CMOS Photodiode Active Pixel Sensor", Chinese Journal of Sensors and Actuators, vol. 18 No. 4, Dec. 2005, pp. 798-801.

* cited by examiner

Figure 38:
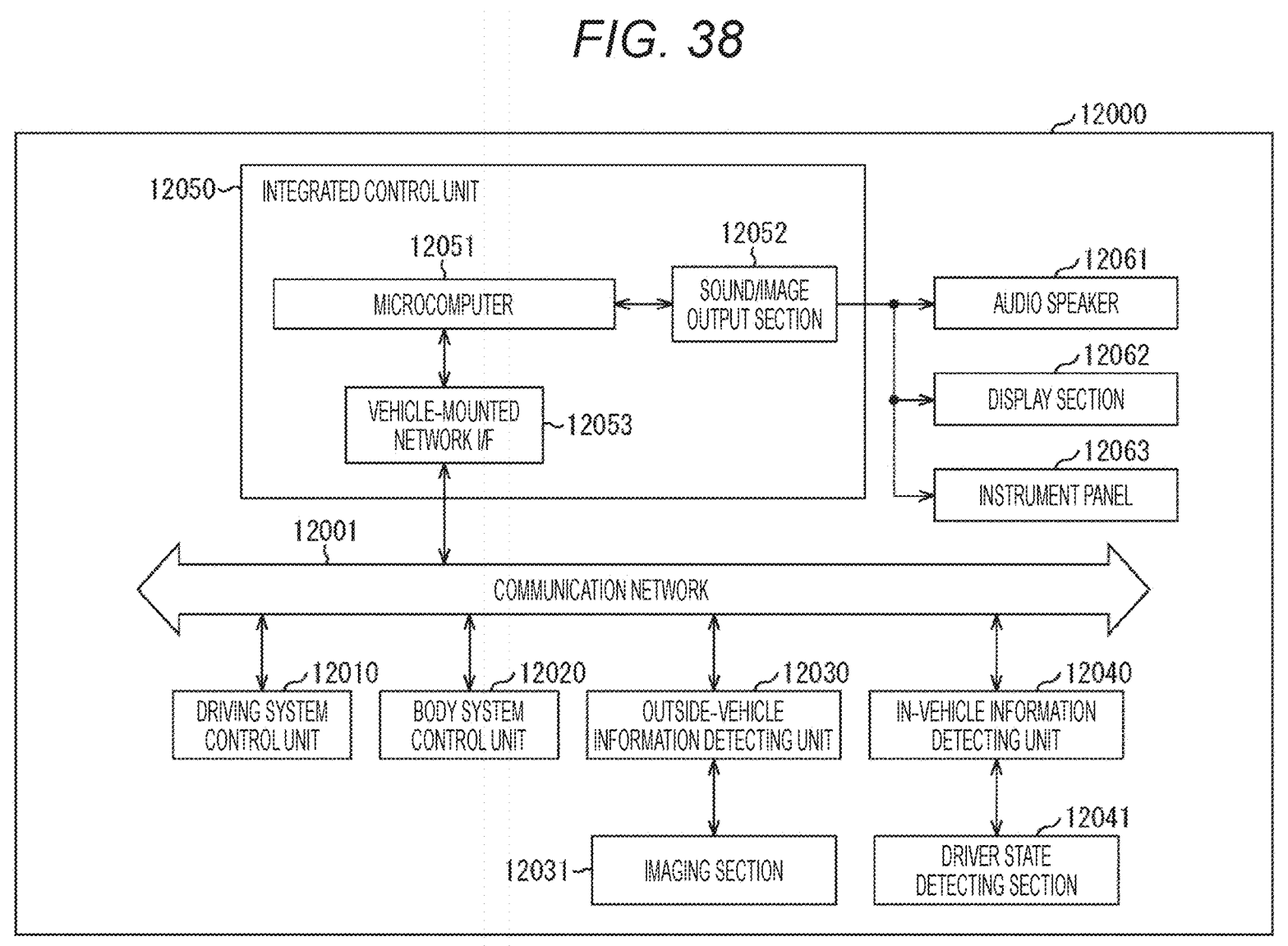

12050 INTEGRATED CONTROL UNIT

12051 MICROCOMPUTER

12053 VEHICLE-MOUNTED NETWORK I/F

12052 SOUND/IMAGE OUTPUT SECTION

12061 AUDIO SPEAKER

12062 DISPLAY SECTION

12063 INSTRUMENT PANEL

12001 COMMUNICATION NETWORK

12010 DRIVING SYSTEM CONTROL UNIT

12020 BODY SYSTEM CONTROL UNIT

12030 OUTSIDE-VEHICLE INFORMATION DETECTING UNIT

12031 IMAGING SECTION

12040 IN-VEHICLE INFORMATION DETECTING UNIT

12041 DRIVER STATE DETECTING SECTION

SENSING DEVICE AND ELECTRONIC DEVICE

CROSS REFERENCE TO RELATED APPLICATIONS

This application is a U.S. National Phase of International Patent Application No. PCT/JP2020/047638 filed on Dec. 21, 2020, which claims priority benefit of Japanese Patent Application No. JP 2020-056938 filed in the Japan Patent Office on Mar. 27, 2020. Each of the above-referenced applications is hereby incorporated herein by reference in its entirety.

TECHNICAL FIELD

The present technology relates to a sensing device. Particularly, the present technology relates to a sensing device and an electronic device capable of detecting whether a photon is present or absent.

BACKGROUND ART

Conventionally, a distance measuring method called a time of flight (ToF) method has been used in an electronic device having a distance measuring function. The ToF method is a method in which a distance is measured by obtaining a round-trip time from emission of irradiation light to an object from the electronic device until the irradiation light is reflected and returns to the electronic device. For example, there has been proposed a solid-state imaging element that measures a distance using the ToF method, and controls an anode potential of a single-photon avalanche diode (SPAD) on the basis of a variation in sensitivity for each chip depending on a process or a temperature (for example, see Patent Document 1). Here, the SPAD is a photodiode improving sensitivity by amplifying a photocurrent.

CITATION LIST

Patent Document

Patent Document 1: Japanese Patent Application Laid-Open No. 2019-75394

SUMMARY OF THE INVENTION

Problems to be Solved by the Invention

In the above-described conventional technology, the variation in sensitivity for each chip is corrected by controlling an anode potential. However, in the chip, the sensitivity may vary for each pixel depending on a process or a temperature. In the above-described solid-state imaging element, the variation in sensitivity for each pixel cannot be corrected. For this reason, there is concern that the variation in sensitivity between pixels may cause a distortion in brightness and darkness in a distance image, resulting in a large variation in distance measurement accuracy.

The present technology has been made in light of such a situation, and an object thereof is to provide a sensing device generating a distance image capable of reducing a variation in distance measurement accuracy in the distance image.

Solutions to Problems

The present technology has been made to solve the above-described problem. According to a first aspect of the present technology, a sensing device includes: a predetermined number of pixel circuits each including a photoelectric conversion element to which a predetermined reverse bias voltage is applied between an anode and a cathode thereof, and a detection circuit that detects whether a photon is present or absent on the basis of a potential of either the anode or the cathode; and a voltage control unit that adjusts the reverse bias voltage to a value corresponding to a breakdown voltage of the photoelectric conversion element for each of the pixel circuits. This causes an effect that a variation in sensitivity is corrected.

Furthermore, in the first aspect, the voltage control unit may include a predetermined number of individual bias circuits connected to the different pixel circuits, respectively, to each supply a predetermined individual bias potential to one of the anode and the cathode. This causes an effect that the individual bias potential is adjusted for each pixel.

Furthermore, in the first aspect, the voltage control unit may further include a common bias circuit connected commonly to the predetermined number of pixel circuits to supply a predetermined common bias potential to another one of the anode and the cathode. This causes an effect that the common bias potential is supplied to all the pixels.

Furthermore, in the first aspect, the individual bias circuit may supply the individual bias potential to the cathode. This causes an effect that the potential of the cathode is adjusted.

Furthermore, in the first aspect, the individual bias circuit may supply the individual bias potential to the anode. This causes an effect that the potential of the anode is adjusted.

Furthermore, in the first aspect, the pixel circuit and the individual bias circuit may be arranged in each of a predetermined number of pixels. This causes an effect that the individual bias potential is adjusted for each pixel.

Furthermore, in the first aspect, the predetermined number of pixel circuits may be dispersedly arranged in a plurality of pixel blocks, and the individual bias circuit may be arranged in each of the plurality of pixel blocks. This causes an effect that the individual bias potential is adjusted for each pixel block.

Furthermore, in the first aspect, the predetermined number of pixel circuits may be dispersedly arranged in a plurality of lines, and the individual bias circuit may be arranged in each of the plurality of lines. This causes an effect that the individual bias potential is adjusted for each line.

Furthermore, in the first aspect, the individual bias circuit may be arranged at a position where heat distribution is not biased in a pixel array unit. This causes an effect that heat is uniformly distributed.

Furthermore, in the first aspect, the sensing device may further include a voltage dividing resistor network in which a predetermined number of nodes are connected to each other via resistors, the predetermined number of nodes may be connected to the different individual bias circuits, respectively, and each of the individual bias circuits may supply the individual bias voltage corresponding to a reference voltage that is a voltage of each of the nodes connected thereto. This causes an effect that the individual bias potential for each pixel is supplied by a simple circuit.

Furthermore, in the first aspect, the sensing device may further include: a measurement value storage unit that stores a measurement value of the breakdown voltage of the photoelectric conversion element for each of the pixel circuits; and a setting unit that sets the reference voltage on the basis of the measurement value. This causes an effect that the individual bias potential corresponding to the measurement value of the breakdown voltage is supplied.

Furthermore, in the first aspect, the voltage control unit may perform control to hold an error of the breakdown voltage with respect to a target value for each of the pixel circuits in the detection circuit, and apply a potential corresponding to the error to the anode. This causes an effect that the reverse bias voltage corresponding to the error of the breakdown voltage is applied.

Furthermore, in the first aspect, the detection circuit may include: a power reset switch that opens or closes a path between the cathode and a power potential; a capacitor inserted between the anode and a low potential lower than a predetermined reference potential; an anode reset switch that opens or closes a path between both ends of the capacitor; a cathode reset switch that opens or closes a path between the cathode and the reference potential; and a logic gate that generates a pulse signal on the basis of a potential of the cathode. This causes an effect that the error of the breakdown voltage is held in the capacitor by controlling the switches.

In addition, in the first aspect, the voltage control unit may sequentially perform reset control of bringing the power reset switch into an opened state and bringing the anode reset switch and the cathode reset switch into a closed state, holding control of bringing the power reset switch and the anode reset switch into a closed state and bringing the cathode reset switch into an opened state to hold the error in the capacitor, and bias control of bringing the power reset switch into a closed state and bringing the anode reset switch and the cathode reset switch into an opened state to supply an excess bias to the cathode. This causes an effect that the excess bias is supplied after the error is held.

Furthermore, according to a second aspect of the present technology, an electronic device includes: a light emitting unit that supplies predetermined irradiation light; a predetermined number of pixel circuits each including a photoelectric conversion element to which a predetermined reverse bias voltage is applied between an anode and a cathode thereof, and a detection circuit that detects whether a photon is present or absent in reflected light with respect to the irradiation light on the basis of a potential of either the anode or the cathode; and a voltage control unit that adjusts the reverse bias voltage to a value corresponding to a breakdown voltage of the photoelectric conversion element for each of the pixel circuits. This causes an effect that a variation in sensitivity to light emitted by the light emitting unit is corrected.

Furthermore, according to a third aspect of the present technology, a sensing device includes: a first pixel circuit including a first photoelectric conversion element, and a first detection circuit that detects whether a photon is present or absent on the basis of a potential of either an anode or a cathode of the first photoelectric conversion element; a second pixel circuit including a second photoelectric conversion element and a first detection circuit that detects whether a photon is present or absent on the basis of a potential of either an anode or a cathode of the second photoelectric conversion element; a first bias circuit connected to either the anode or the cathode of the first photoelectric conversion element; a second bias circuit connected to either the anode or the cathode of the second photoelectric conversion element; and a reference voltage supply unit that supplies different reference voltages to the first and second bias circuits, respectively, to supply the potentials corresponding to the respective reference voltages. This causes an effect that different potentials are supplied for the respective pixel circuits.

BRIEF DESCRIPTION OF DRAWINGS

FIG. 38 is a block diagram depicting an example of schematic configuration of a vehicle control system.

MODE FOR CARRYING OUT THE INVENTION

Modes for carrying out the present technology (hereinafter referred to as embodiments) will be described below. The description will be given in the following order.

1. First embodiment (an example in which a reverse bias for each pixel is adjusted by an individual bias potential)

2. Second embodiment (an example in which a reverse bias for each pixel is adjusted by a potential corresponding to an error of a breakdown voltage)
3. Example of Application to Mobile Body

1. First Embodiment

[Configuration Example of Distance Measuring Module]

Figure 1:
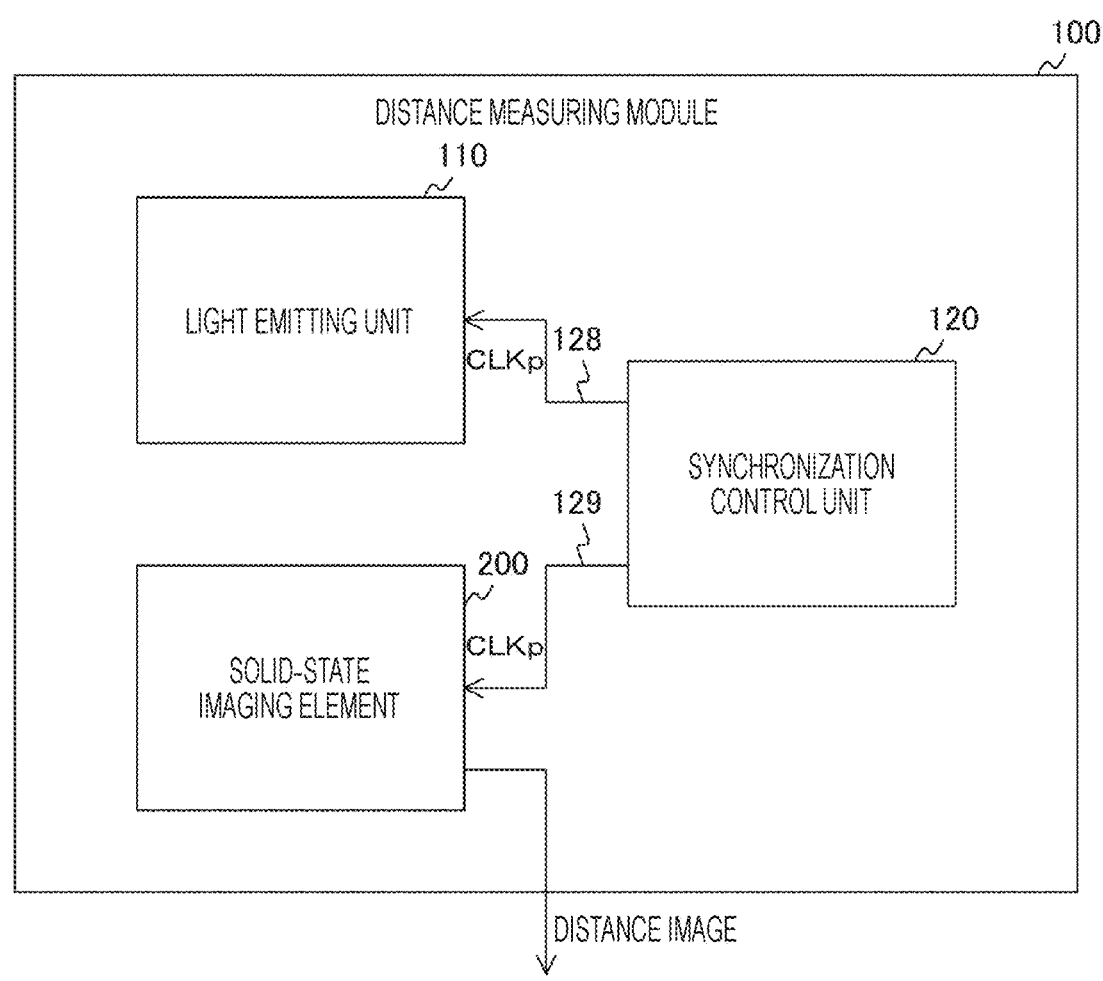
FIG. 1 is a block diagram illustrating a configuration example of a distance measuring module in a first embodiment of the present technology.

FIG. 1 is a block diagram illustrating a configuration example of a distance measuring module 100 in a first embodiment of the present technology. The distance measuring module 100 measures a distance to an object, and includes a light emitting unit 110, a synchronization control unit 120, and a solid-state imaging element 200. The distance measuring module 100 is mounted on a smartphone, a personal computer, an in-vehicle device, or the like, and is used to measure a distance. Note that the device with the distance measuring module 100 installed thereon is an example of an electronic device described in the claims.

The synchronization control unit 120 operates the light emitting unit 110 and the solid-state imaging element 200 in synchronization with each other. The synchronization control unit 120 supplies a clock signal of a predetermined frequency (e.g., 10 to 20 megahertz) as a light emission control signal CLKp to the light emitting unit 110 and the solid-state imaging element 200 via signal lines 128 and 129, respectively.

The light emitting unit 110 supplies intermittent light as irradiation light in synchronization with the light emission control signal CLKp from the synchronization control unit 120. For example, near-infrared light or the like is used as the irradiation light.

The solid-state imaging element 200 receives reflected light with respect to the irradiation light to measure a round-trip time from a light emission timing indicated by the light emission control signal CLKp to a timing at which the reflected light is received. The solid-state imaging element 200 calculates a distance to the object for each pixel from the round-trip time, and generates and outputs a distance image in which distance data indicating the distance is arranged. Note that the solid-state imaging element 200 is an example of a sensing device described in the claims.

[Configuration Example of Solid-State Imaging Element]

Figure 2:
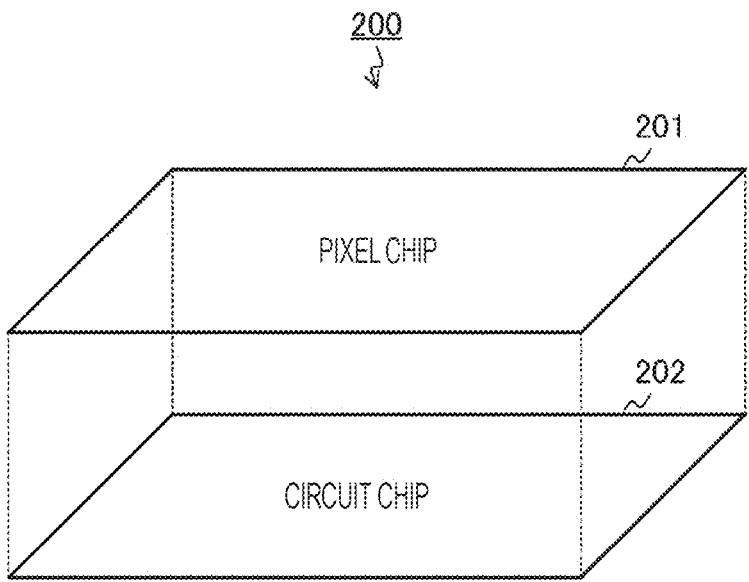
FIG. 2 is a diagram illustrating an example of a stack structure of a solid-state imaging element in the first embodiment of the present technology.

FIG. 2 is a diagram illustrating an example of a stack structure of the solid-state imaging element 200 in the first embodiment of the present technology. The solid-state imaging element 200 includes a circuit chip 202 and a pixel chip 201 stacked on the circuit chip 202. These chips are electrically connected through a connector such as a via. Note that the chips can also be connected to each other by a Cu—Cu bond or a bump, rather than the via.

Figure 3:
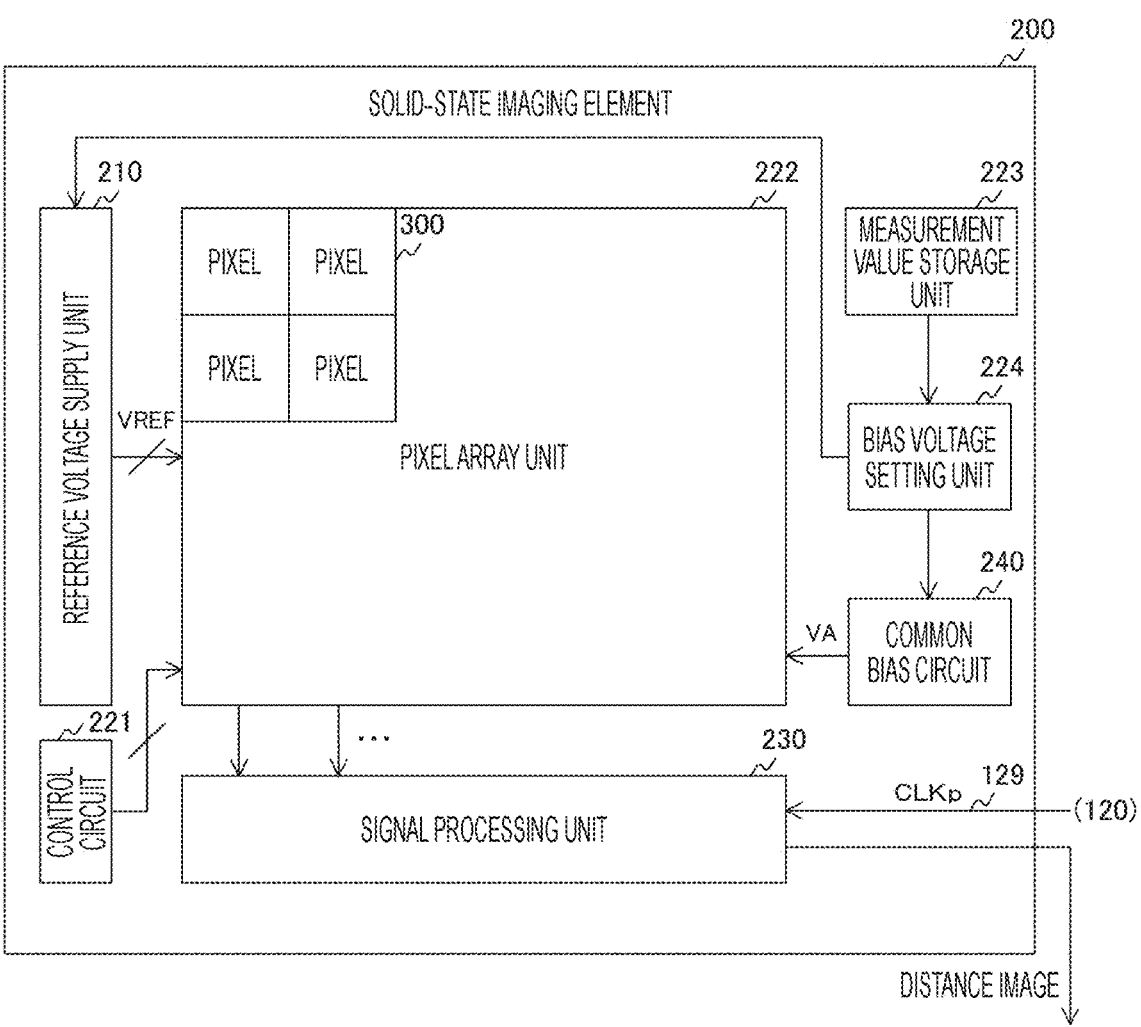
FIG. 3 is a block diagram illustrating a configuration example of the solid-state imaging element in the first embodiment of the present technology.

FIG. 3 is a block diagram illustrating a configuration example of the solid-state imaging element 200 in the first embodiment of the present technology. The solid-state imaging element 200 includes a reference voltage supply unit 210, a control circuit 221, a pixel array unit 222, a measurement value storage unit 223, a bias voltage setting unit 224, a signal processing unit 230, and a common bias circuit 240. Furthermore, in the pixel array unit 222, a plurality of pixels 300 are arrayed in a two-dimensional lattice pattern.

The reference voltage supply unit 210 individually supplies a reference voltage VREF for each pixel. The control circuit 221 sequentially drives rows to output pulse signals.

The pixel 300 detects whether a photon is present or absent using an SPAD. The pixel 300 outputs a pulse signal indicating a detection result to the signal processing unit 230.

The signal processing unit 230 calculates a distance by measuring a round-trip time for each pixel on the basis of the pulse signal from the pixel 300 and the light emission control signal CLKp from the synchronization control unit 120. The signal processing unit 230 generates a distance image in which distance data indicating the distance is arranged, and outputs the distance image to the outside.

The measurement value storage unit 223 holds a digital signal for each pixel indicating a measurement value of a breakdown voltage of the SPAD in each pixel. In addition, in the measurement value storage unit 223, a target value to be used for the calculation of the bias voltage setting unit 224 is held as well as the measurement value. The target value will be described later. As the measurement value storage unit 223, for example, a non-volatile memory or a register is used.

The bias voltage setting unit 224 reads out the measurement value and the target value for each pixel from the measurement value storage unit 223, and sets an output voltage of each of the reference voltage supply unit 210 and the common bias circuit 240 on the basis of the read-out values.

The common bias circuit 240 supplies a predetermined common bias potential as an anode potential VA to all the pixels.

[Configuration Example of Pixel and Common Bias Circuit]

Figure 4:
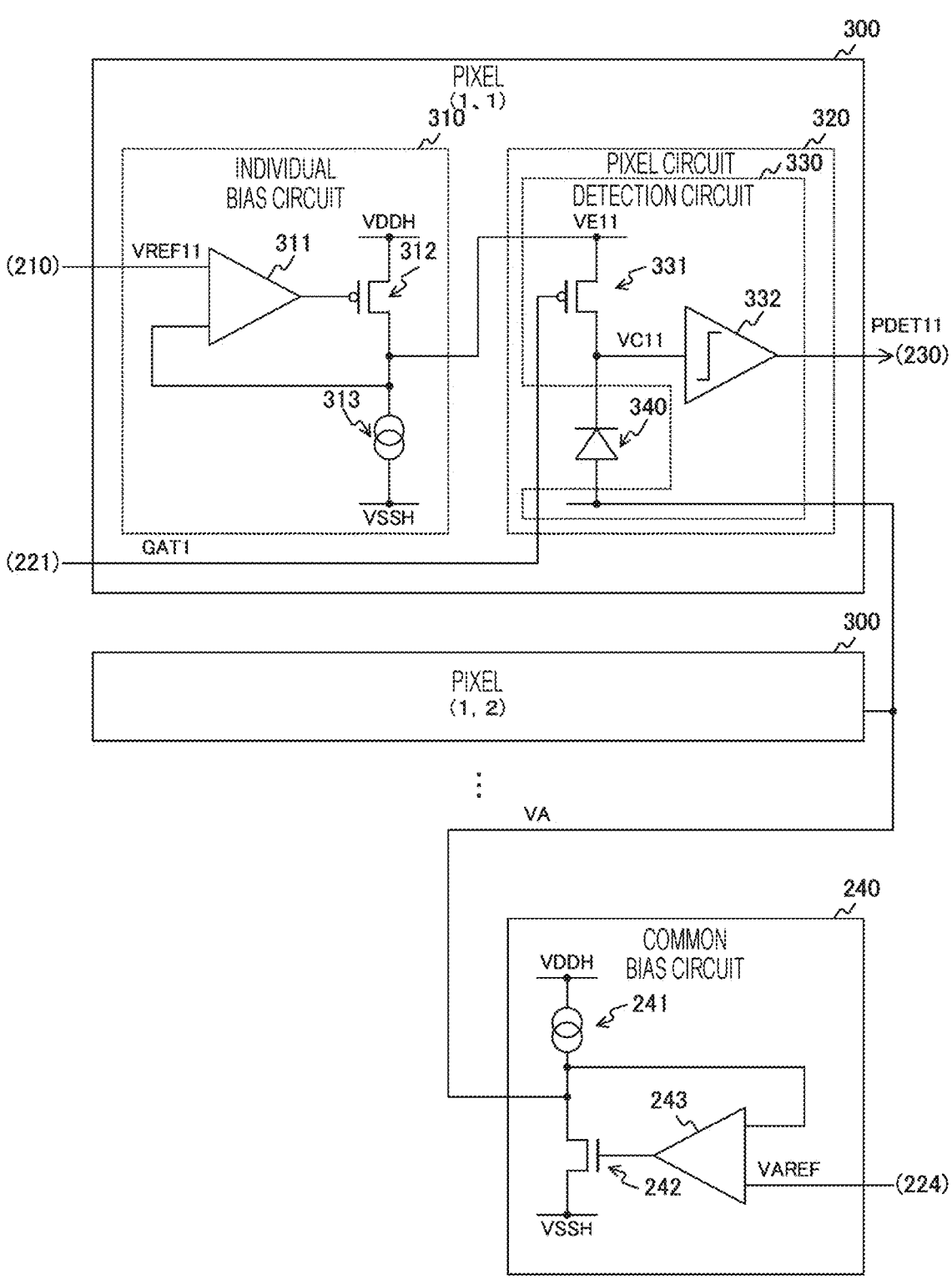
FIG. 4 is a circuit diagram illustrating a configuration example between a pixel and a common bias circuit in the first embodiment of the present technology.

FIG. 4 is a circuit diagram illustrating a configuration example between the pixel 300 and the common bias circuit 240 in the first embodiment of the present technology. Each of the pixels 300 includes an individual bias circuit 310 and a pixel circuit 320.

The individual bias circuit 310 generates a potential corresponding to the reference voltage VREF from the reference voltage supply unit 210 as an individual bias potential VE, and supplies the generated individual bias potential VE to the pixel circuit 320 in the same pixel. A reference voltage supplied to a pixel 300 in an x-th row (x is an integer of 1 to X) and a y-th column (y is an integer of 1 to Y) will be denoted by VREFxy. Note that the individual bias circuit 310 for each pixel is an example of each of first and second bias circuits described in the claims.

The individual bias circuit 310 includes an operational amplifier 311, a p-channel metal oxide semiconductor (pMOS) transistor 312, and a current source 313. The pMOS transistor 312 and the current source 313 are connected to each other in series between a power supply voltage VDDH and a reference potential VSSH.

In addition, one of two input terminals of the operational amplifier 311 is connected to the reference voltage supply unit 210, and the other one of the two input terminals of the operational amplifier 311 is connected to a connection node between the pMOS transistor 312 and the current source 313. An output terminal of the operational amplifier 311 is connected to a gate of the pMOS transistor 312. Further, a potential of the connection node between the pMOS transistor 312 and the current source 313 is supplied to a detection circuit 330 as an individual bias potential VE. Hereinafter, an individual bias potential of a pixel 300 in an x-th row and a y-th column will be denoted by VExy.

The pixel circuit 320 includes a detection circuit 330 and a SPAD 340. The detection circuit 330 includes a drive transistor 331 and a logic gate 332.

The drive transistor 331 opens or closes a path between a cathode of the SPAD 340 and the node of the individual bias potential VExy according to a drive signal GAT from the control circuit 221. When the pixel circuit 320 is driven in Geiger mode, the control circuit 221 controls the drive transistor 331 to a closed state using the drive signal GAT.

The logic gate 332 generates a pulse signal PDET indicating a result of detecting whether a photon is present or absent on the basis of a cathode potential VC of the SPAD 340. For example, an inverter is used as the logic gate 332. For example, the logic gate 332 outputs a high-level pulse signal PDET to the signal processing unit 230 in a case where the cathode potential VC is equal to or smaller than a predetermined threshold value, and outputs a low-level pulse signal PDET to the signal processing unit 230 in a case where the cathode potential VC exceeds the predetermined threshold value.

Hereinafter, a drive signal to an x-th row will be denoted by GATx, and a cathode potential and a pulse signal of a pixel 300 in an x-th row and a y-th column will be denoted by VCxy and PDETxy, respectively.

In addition, the common bias circuit 240 includes a current source 241, an nMOS transistor 242, and an operational amplifier 243. The current source 241 and the nMOS transistor 242 are connected to each other in series between the power supply voltage VDDH and the reference potential VSSH.

Furthermore, a reference voltage VAREF from the bias voltage setting unit 224 is input to one of two input terminals of the operational amplifier 243, and the other one of the two input terminals of the operational amplifier 243 is connected to a connection node between the current source 241 and the nMOS transistor 242. An output terminal of the operational amplifier 243 is connected to a gate of the nMOS transistor 242. Furthermore, a potential of the connection node between the current source 241 and the nMOS transistor 242 is supplied to anodes of the SPADs 340 of all the pixels as a common bias potential (i.e., an anode potential VA).

With the above-described configuration, in each of the pixels, the individual bias circuit 310 generates an individual bias potential VE corresponding to the reference voltage VREFxy, and supplies the generated individual bias potential VE to the corresponding pixel circuit 320. Furthermore, the common bias circuit 240 supplies a common bias potential (an anode potential VA) corresponding to the reference voltage VAREF to the anodes of the SPADs 340 of all the pixels.

In addition, in the Geiger mode, a voltage between the individual bias potential VExy and the anode potential VA is applied as a reverse bias voltage between the anode and the cathode of the SPAD 340. Then, when a photon is incident on the pixel 300 in a state where the reverse bias voltage is applied thereto, the SPAD 340 multiplies a charge obtained by photoelectrically converting the photon in an avalanche to generate a photocurrent. When the cathode potential VCxy of the SPAD 340 drops and becomes equal to or smaller than the threshold value according to the photocurrent, the logic gate 332 detects the photon and outputs a high-level pulse signal PDETxy.

Here, the pixels may vary in the breakdown voltage of the SPAD 340 depending on a process or a temperature. Due to the variation in breakdown voltage, the pixels vary in photon detection efficiency (PDE). For this reason, the individual bias circuit 310 supplies an individual bias potential VE corresponding to a breakdown voltage measurement value of the corresponding pixel. For example, the lower the breakdown voltage, the lower value to which the individual bias potential VE is adjusted. The individual bias potential makes it possible to apply a reverse bias voltage having a value corresponding to the breakdown voltage, thereby correcting a variation in PDE for each pixel.

Note that the detection circuit 330 can detect whether a photon is present or absent on the basis of a potential of the cathode of the SPAD 340, but can also detect whether a photon is present or absent on the basis of a potential of the anode of the SPAD 340.

Figure 5:
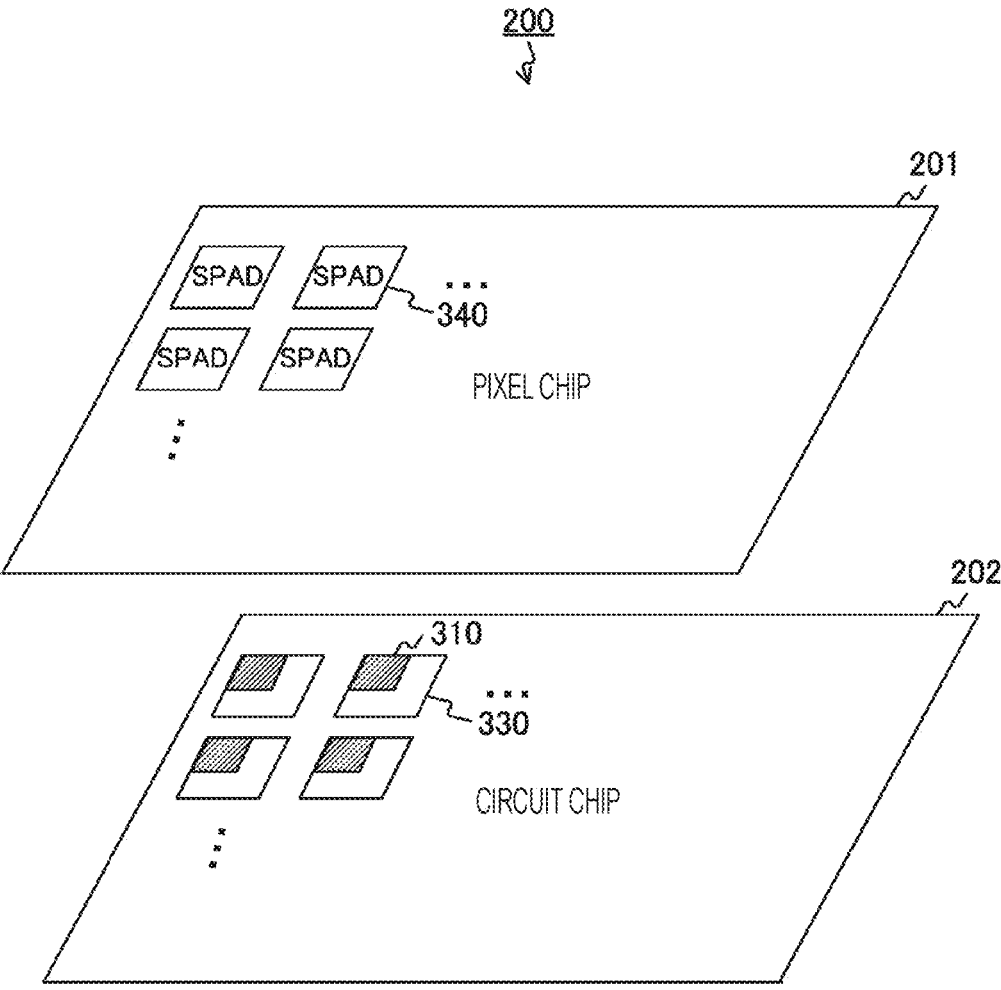
FIG. 5 is a diagram illustrating an arrangement example of circuits and elements for each chip in the first embodiment of the present technology.

FIG. 5 is a diagram illustrating an arrangement example of circuits and elements for each chip in the first embodiment of the present technology. In the pixel chip 201, the SPAD 340 is arranged for each pixel. On the other hand, in the circuit chip 202 on which the pixel chip 201 is disposed, the individual bias circuit 310 and the detection circuit 330 corresponding to the SPAD 340 are arranged under each of the SPADs 340.

[Configuration Example of Signal Processing Unit]

Figure 6:
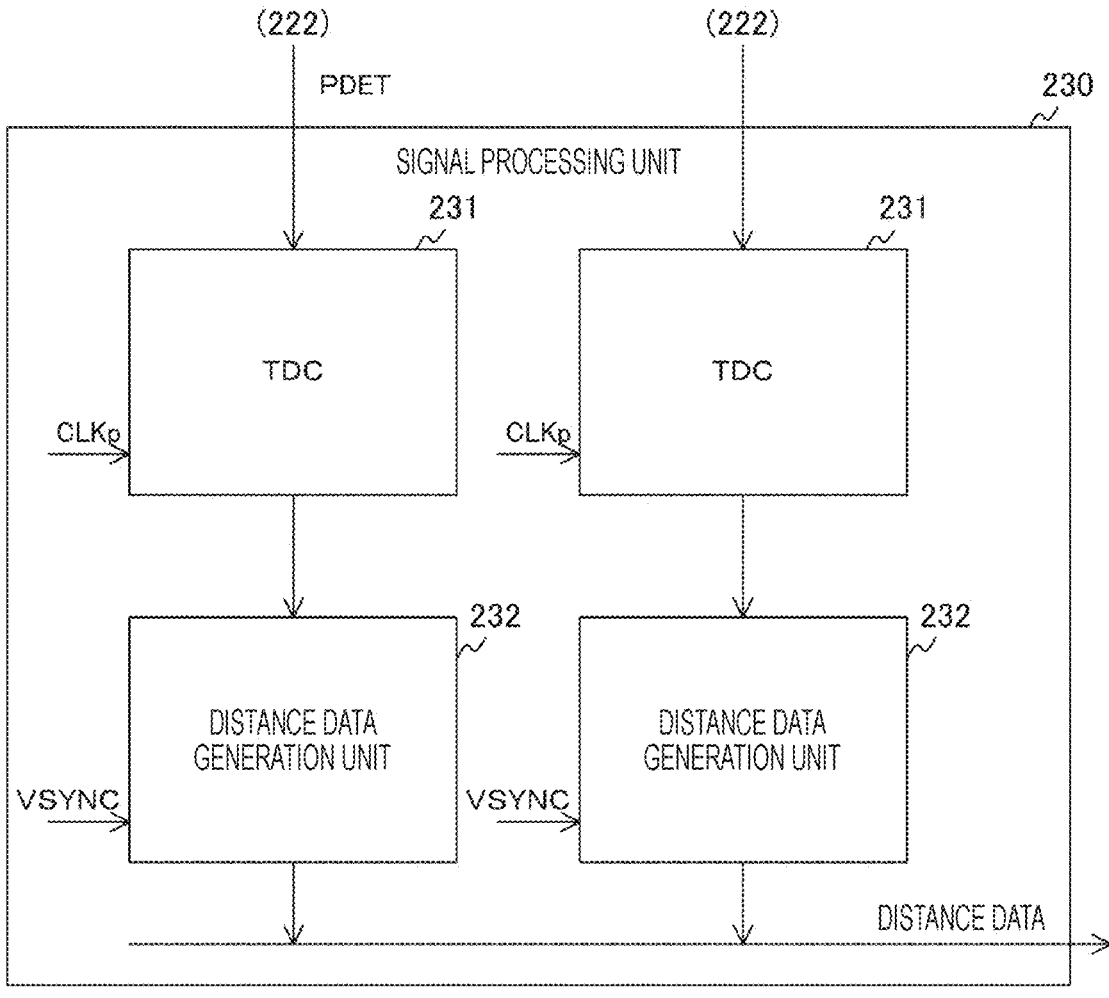
FIG. 6 is a block diagram illustrating a configuration example of a signal processing unit in the first embodiment of the present technology.

FIG. 6 is a block diagram illustrating a configuration example of the signal processing unit 230 in the first embodiment of the present technology. The signal processing unit 230 includes a time-to-digital converter (TDC) 231 and a distance data generation unit 232 for each column.

The TDC 231 measures a time from a light emission timing indicated by a light emission control signal CLKp to the start of production of a pulse signal PDET from the corresponding column (i.e. a light reception timing). The TDC 231 supplies a digital signal indicating the measured time to the distance data generation unit 232.

The distance data generation unit 232 calculates a distance D to an object. For each cycle based on a vertical synchronization signal VSYNC having a frequency (e.g., 30 hertz) lower than the light emission control signal CLKp, the distance data generation unit 232 obtains a mode value among times measured by the TDC 231 during each cycle as a round-trip time dt. Then, the distance data generation unit 232 calculates a distance D using the following equation and generates distance data indicating the distance D. Data in which the distance data for each pixel is arranged is output as a distance image.

$$D = c \times dt/2$$

In the above equation, c is a speed of light, of which the unit is meters per second (m/s). Furthermore, the unit of the distance D is, for example, meter (m), and the unit of the round-trip time dt is, for example, second (s).

Figure 7:
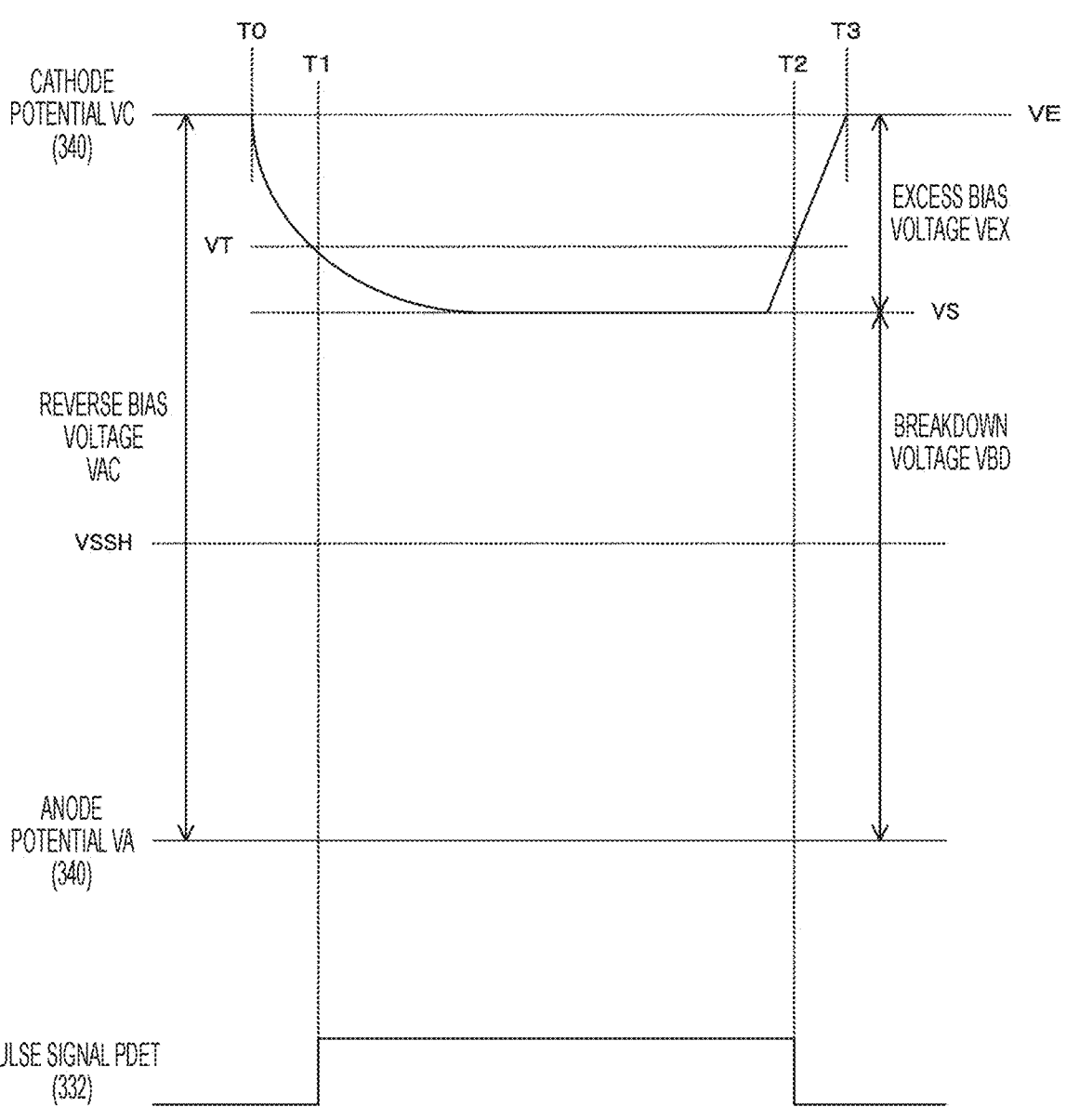
FIG. 7 is a timing chart illustrating an example of fluctuations in cathode potential and pulse signal in the first embodiment of the present technology.

FIG. 7 is a timing chart illustrating an example of fluctuations in cathode potential and pulse signal in the first embodiment of the present technology. In an initial state of the Geiger mode, the individual bias potential VE is applied to the cathode of the SPAD 340. In this way, the cathode potential VC becomes the individual bias potential VE. The anode potential VA of all the pixels is lower than the reference potential VSSH. At this time, a voltage between the individual bias potential VE and the anode potential VA is applied as a reverse bias voltage VAC between the anode and the cathode of the SPAD 340. The reverse bias voltage VAC is set to a voltage having an absolute value larger than that of a breakdown voltage VBD when an avalanche breakdown occurs. A difference between the breakdown voltage VBD and the reverse bias voltage VAC is called an excess bias voltage VEX.

When a photon is incident at timing TO, the SPAD 340 multiplies a charge obtained by photoelectrically converting the photon in an avalanche to generate a photocurrent. The cathode potential VC of the SPAD 340 drops according to the photocurrent. Then, when the cathode potential VC becomes equal to or smaller than a threshold value VT of the logic gate 332 at timing T1, the logic gate 332 outputs a high-level pulse signal PDET. In this way, the incidence of the photon is detected. The cathode potential VC drops to a bottom potential VS corresponding to the excess bias voltage VEX.

Then, when the cathode potential VC rises by recharging and exceeds the threshold value VT at timing T2, the logic gate 332 returns the pulse signal PDET to the low level. The cathode potential VC returns to the original individual bias potential VE at timing T3.

As described above, the pixels may vary in breakdown voltage VBD depending on a process or a temperature. In order to observe the influence of the variation, a comparative example is presented, in which the same potential VE' is applied to the cathodes of all the pixels, rather than providing the individual bias circuit 310.

Figure 8:
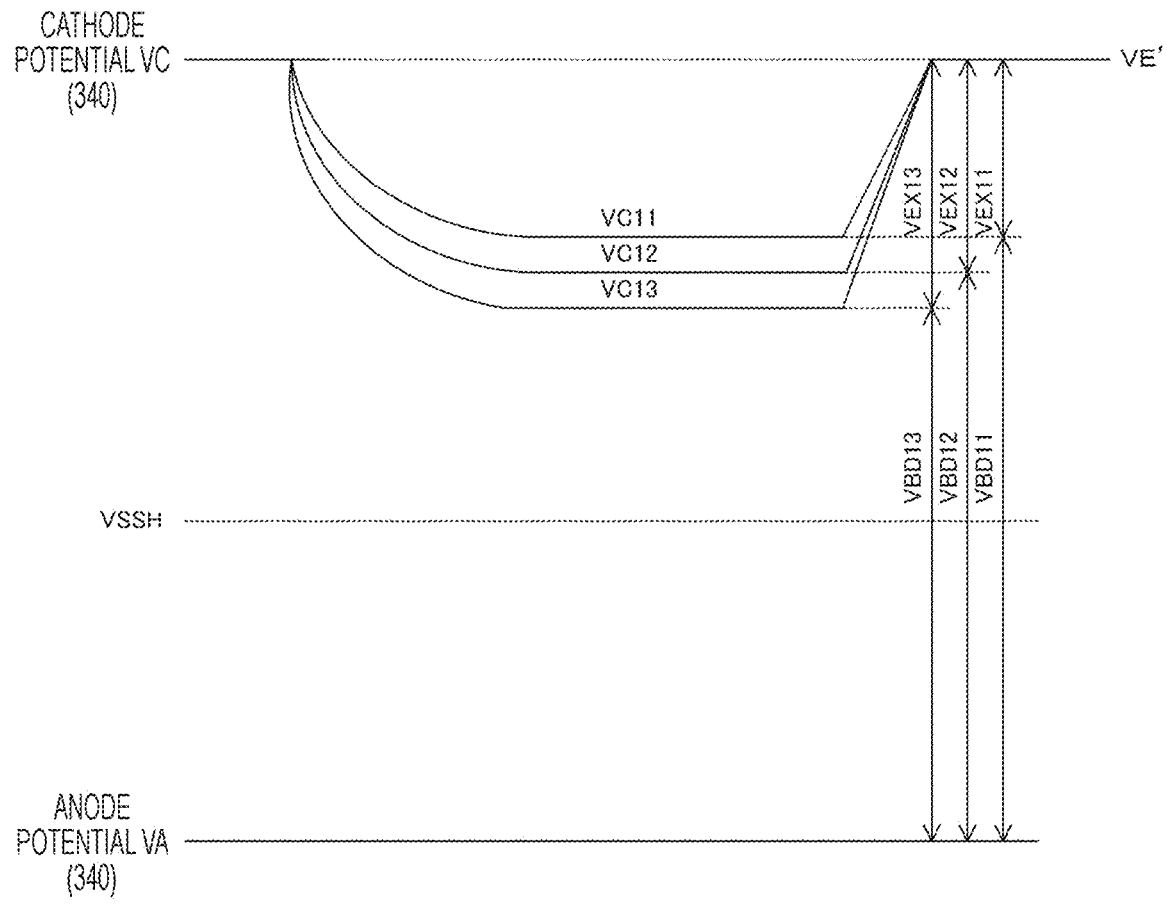
FIG. 8 is a timing chart illustrating an example of a fluctuation in cathode potential in a comparative example.

FIG. 8 is a timing chart illustrating an example of a fluctuation in cathode potential in the comparative example. Attention is paid to three pixels of addresses (1, 1), (1, 2), and (1, 3). It is assumed that a breakdown voltage VBD11 at the address (1, 1) is larger than a breakdown voltage VBD12 at the address (1, 2), and the breakdown voltage VBD12 is larger than a breakdown voltage VBD13 at the address (1, 3). In this case, since the initial potential VE' of the cathode is the same (in other words, the reverse bias is the same) between the pixels, an excess bias voltage VEX11 at the address (1, 1) is smaller than an excess bias voltage VEX12 at the address (1, 2). In addition, the excess bias voltage VEX12 is smaller than an excess bias voltage VEX13 at the address (1, 3).

Due to the variation in excess bias voltage VEX, at the time when a photon is incident, a drop amount of a cathode potential VC11 at the address (1, 1) is smaller than that of a cathode potential VC12 at the address (1, 2). Also, the drop amount of the cathode potential VC12 is smaller than that of a cathode potential VC13 at the address (1, 3). As described above, in the comparative example, the drop amount of the cathode potential varies, causing a variation in PDE for each pixel.

Figure 9:
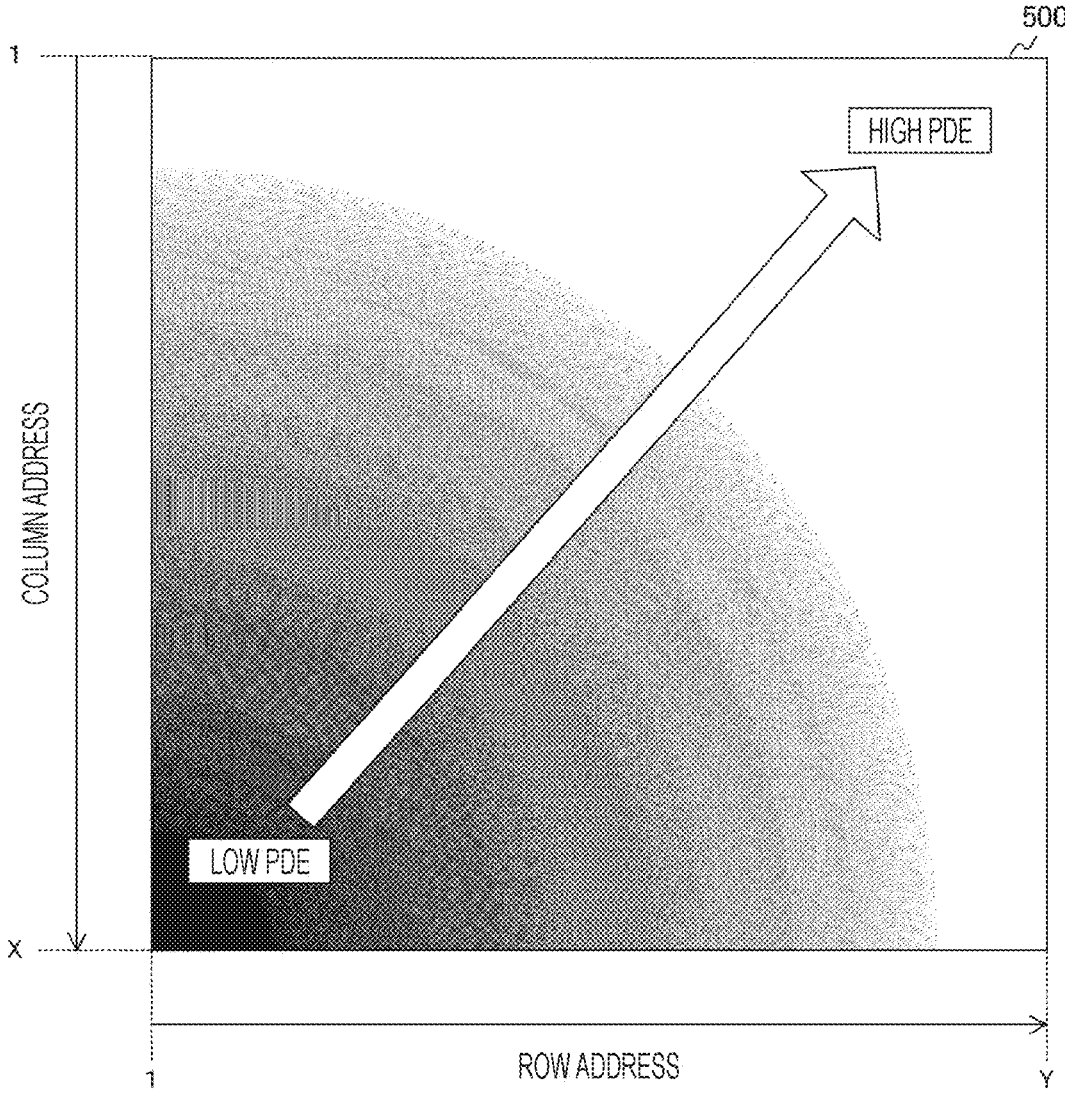
FIG. 9 is a diagram illustrating an example of a distance image in which sensitivity varies in the comparative example.

FIG. 9 is a diagram illustrating an example of a distance image in which sensitivity varies in the comparative example. FIG. 9 illustrates a distance image 500 when light having a uniform luminance is incident on all the pixels. In the distance image 500, a pixel value is determined based on the PDE of the pixel. In FIG. 9, a pixel with high PDE is represented by a light color, and a pixel with low PDE is represented by a dark color.

In a case where the pixels vary in breakdown voltage VBD depending on a process or a temperature, PDE varies between the pixels due to the influence of the variation in breakdown voltage. For example, a lower left address (X, 1) has low PDE, an upper right address (1, Y) has high PDE, and the PDE gradually increases from a lower left end to an upper right end. In the comparative example, the variation in PDE between the pixels is not corrected, and thus, the variation causes a distortion in brightness and darkness in the distance image. This distortion is called shading noise.

Figure 10:
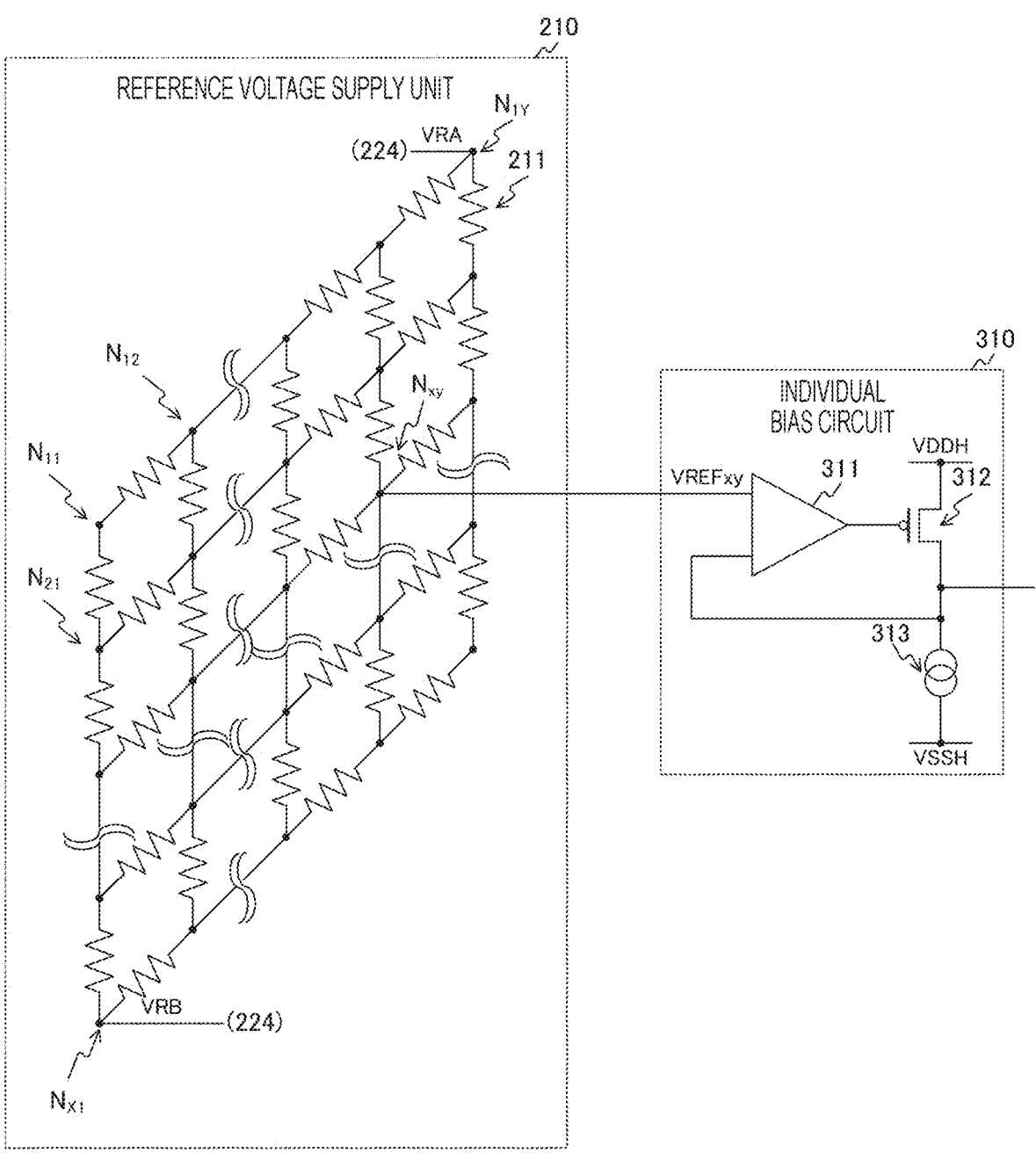
FIG. 10 is a circuit diagram illustrating a configuration example of a reference voltage supply unit in the first embodiment of the present technology.

FIG. 10 is a circuit diagram illustrating a configuration example of the reference voltage supply unit 210 in the first embodiment of the present technology. The reference voltage supply unit 210 includes a voltage dividing resistor network in which a plurality of nodes N are connected to each other via resistors 211. The node N is provided for each pixel, and a node at an address (x, y) will be denoted by $N_{xy}$.

In order to suppress the shading noise described above, the distance measuring module 100 measures a breakdown voltage VBD for each pixel in advance at the time of product shipment or the like. At the time of measurement, any one of the following three measurement methods is adopted.

(1) A method in which breakdown voltages VBD for the respective pixels are measured by connecting a measurement circuit to the cathodes of the SPADs 340 of all the pixels.

(2) A method in which breakdown voltages VBD of some parts (e.g., four corners) of the pixel array unit 222 are measured, and breakdown voltages VBD of the other parts of the pixel array unit 222 are estimated.

(3) A method in which replica pixels for measurement are separately prepared to measuring breakdown voltages VBD.

A digital signal indicating a measurement value for each pixel is held in the measurement value storage unit 223. When activated, the bias voltage setting unit 224 reads out a measurement value and a target value from the measurement value storage unit 223, and sets an output voltage of each of the reference voltage supply unit 210 and the common bias circuit 240 on the basis of the read-out values.

For example, as illustrated in FIG. 9, in a case where the PDE gradually increases from the lower left address (X, 1) to the upper right address (1, Y), a breakdown voltage VBD is measured as gradually decreasing from the lower left end to the upper right end. In this case, the bias voltage setting unit 224 supplies a predetermined input voltage VRB to a lower left node $N_{X1}$ and supplies an input voltage VRA lower than the input voltage VRB to an upper right node $N_{1Y}$. These input voltages VRA and VRB are generated by, for example, a digital-to-analog converter (DAC).

Then, a divided voltage between the input voltage VRA and the input voltage VRB is generated at each of the nodes by the voltage dividing resistor network. When the input voltage VRA is lower than the input voltage VRB, the divided voltage gradually decreases from the upper left end to the upper right end. The divided voltage at the node $N_{xy}$ is supplied as a reference voltage VREFxy to the individual bias circuit 310 at the address (x, y).

Note that a resistance value of each of the resistors 211 may be variable. When the resistance value is variable, a set value of the resistance value is held in the resistor or the like, and the resistance value is controlled based on the set value.

Furthermore, in the reference voltage supply unit 210, the reference voltage VREF for each pixel is generated by the voltage dividing resistor network, but the reference voltage VREF can also be generated by a circuit other than the voltage dividing resistor network.

Figure 11:
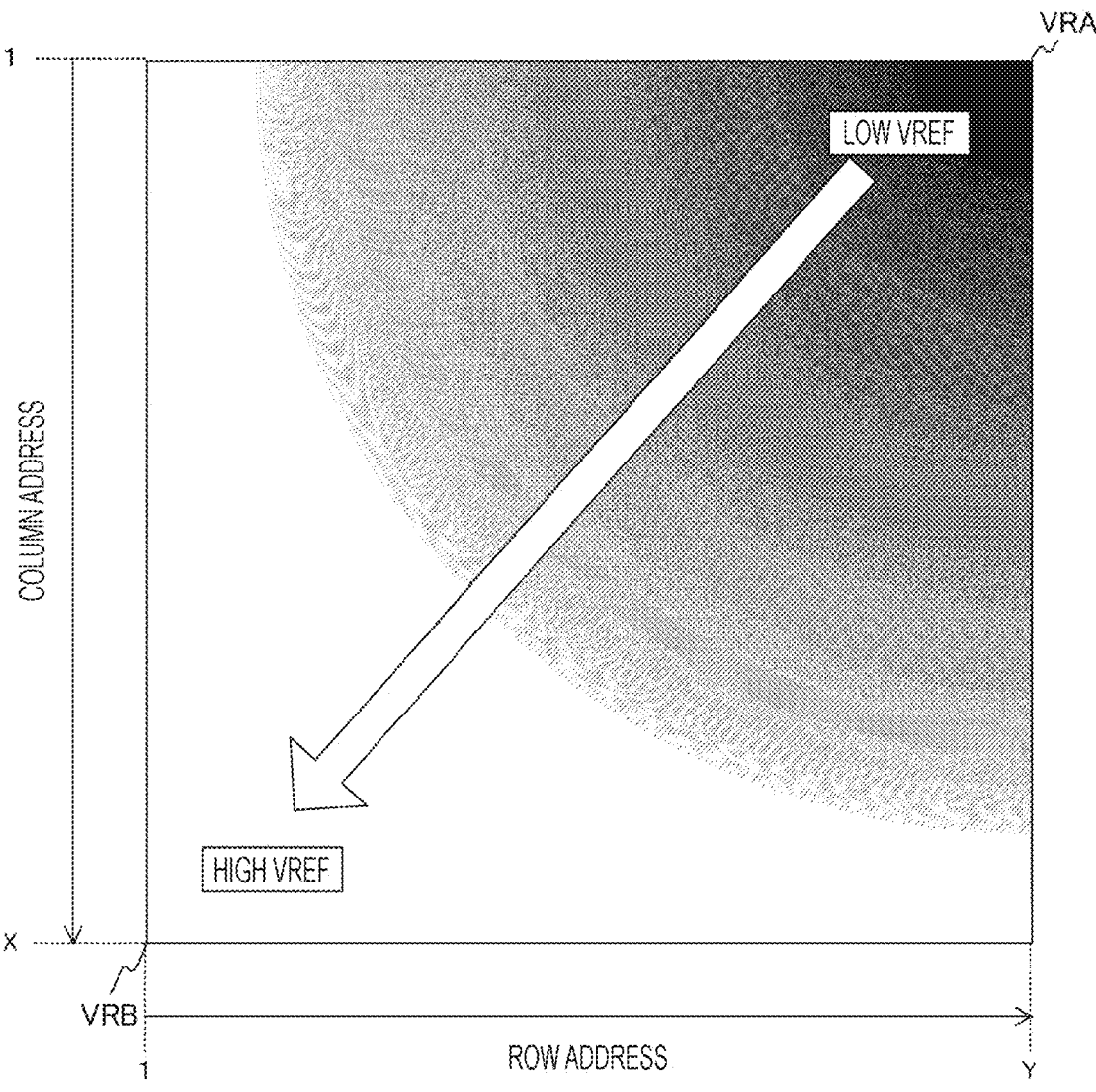
FIG. 11 is a diagram illustrating a setting example of a reference voltage in the first embodiment of the present technology.

FIG. 11 is a diagram illustrating a setting example of the reference voltage VREF in the first embodiment of the present technology. In a case where the PDE gradually increases from the lower left address (X, 1) to the upper right address (1, Y), a reference voltage VREF is set as gradually increasing from the upper right end to the lower left end.

Figure 12:
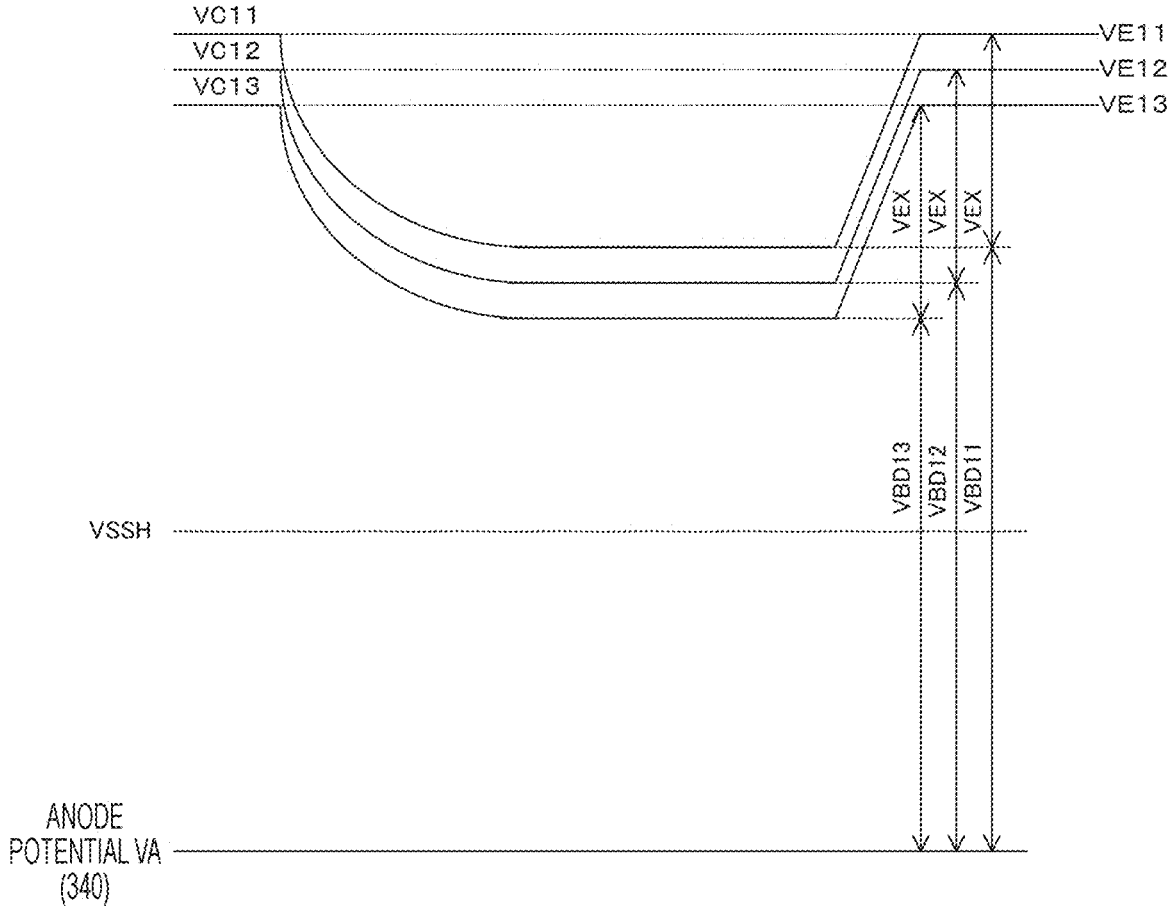
FIG. 12 is a timing chart illustrating an example of a fluctuation in cathode potential in the first embodiment of the present technology.

FIG. 12 is a timing chart illustrating an example of a fluctuation in cathode potential in the first embodiment of the present technology. As described with reference to FIGS. 9 to 11, since the reference voltage VREF is set to correspond to the breakdown voltage VBD, the individual bias potential VE correspond to the breakdown voltage VBD is applied to the cathode of each of the pixels.

For example, it is assumed that a breakdown voltage VBD11 at the address (1, 1) is larger than a breakdown voltage VBD12 at the address (1, 2), and the breakdown voltage VBD12 is larger than a breakdown voltage VBD13 at the address (1, 3). At this time, an individual bias potential VE11 is supplied to the address (1, 1), the individual bias potential VE11 being larger than an individual bias potential VE12 at the address (1, 2). Also, the individual bias potential VE12 is supplied to the address (1, 2), the individual bias potential VE12 being larger than an individual bias potential VE13 at the address (1, 3).

By applying these individual bias potentials, the excess bias voltage VEX becomes substantially the same between the pixels. Accordingly, at the time when a photon is incident, the drop amount of the cathode potential is substantially the same between the pixels, and the PDE is also substantially the same between the pixels.

Figure 13:
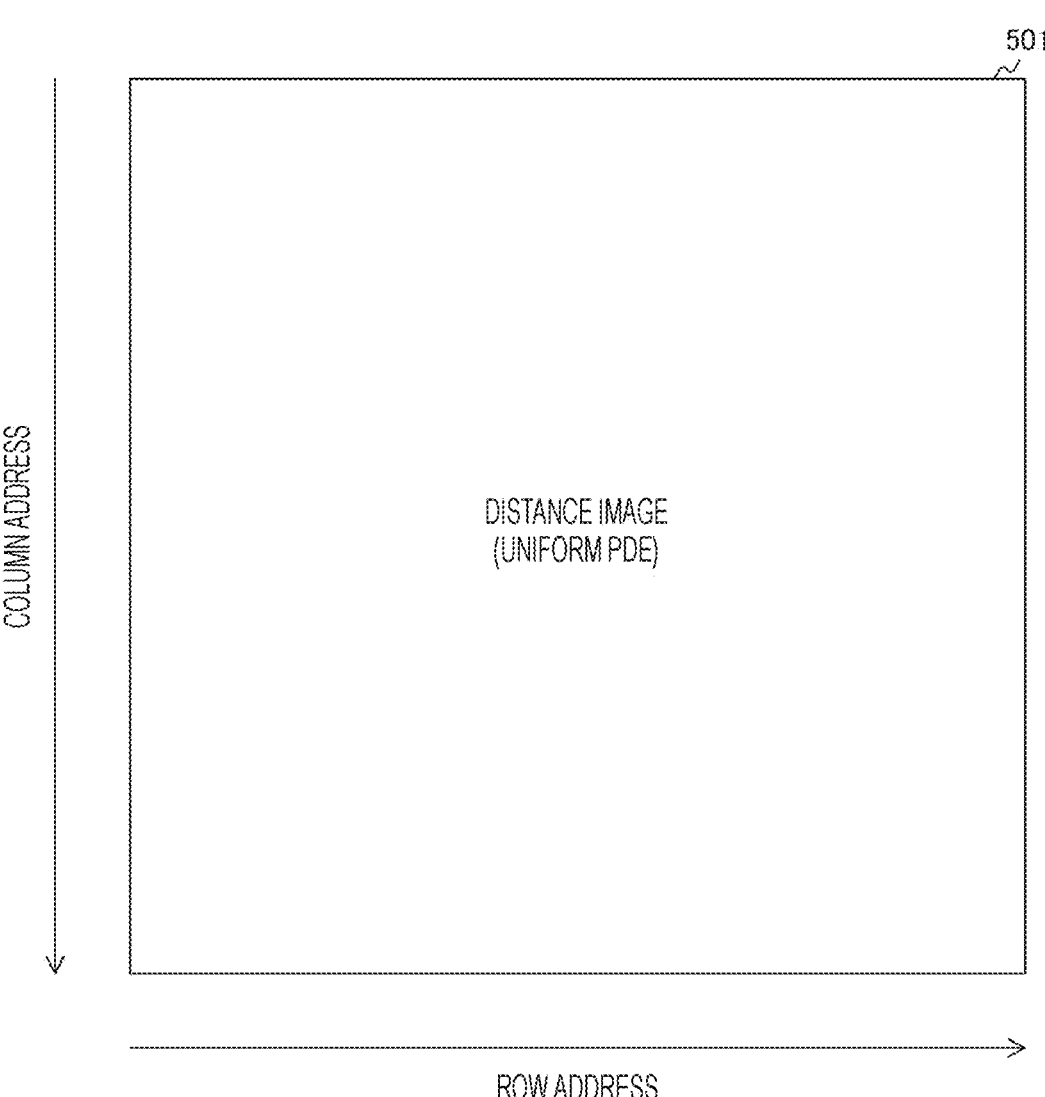
FIG. 13 is a diagram illustrating an example of sensitivity for each pixel of the distance image in the first embodiment of the present technology.

FIG. 13 is a diagram illustrating an example of sensitivity for each pixel in the distance image in the first embodiment of the present technology. FIG. 9 illustrates a distance image 500 when light having a uniform luminance is incident on all the pixels.

In a case where the pixels vary in breakdown voltage VBD as in the comparative example, shading noise occurs as illustrated in FIG. 9. In this regard, in the distance measuring module 100, the reference voltage VREF is set to a value corresponding to the breakdown voltage VBD for each pixel to adjust a bias potential as illustrated in FIG. 11. As a result, as illustrated in FIG. 13, the PDE is uniform between the pixels, thereby suppressing shading noise. Therefore, it is possible to reduce variations in distance measurement accuracy in the distance image 501.

Figure 14:
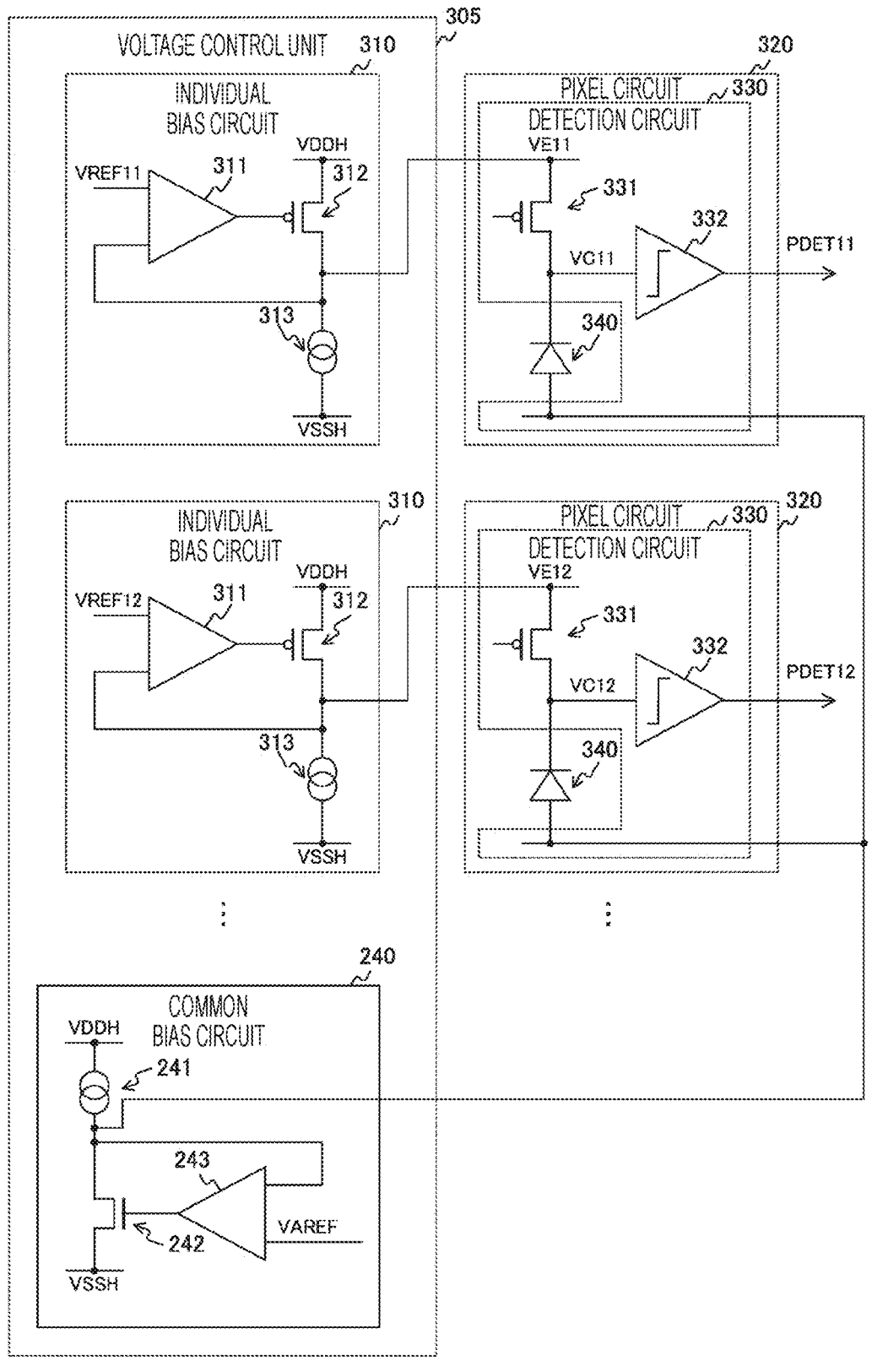
FIG. 14 is a diagram for explaining voltage control in the first embodiment of the present technology.

FIG. 14 is a diagram for explaining voltage control in the first embodiment of the present technology. Each of the pixel circuits 320 includes an SPAD 340 and a detection circuit 330. In the Geiger mode, a reverse bias voltage is applied between the anode and the cathode of the SPAD 340. The detection circuit 330 detects whether a photon is present or absent on the basis of a potential of the cathode of the SPAD 340.

Furthermore, the individual bias circuit 310 is connected to each of the pixel circuits 320. The individual bias circuit 310 supplies an individual bias potential VE (e.g., VE11 or VE12) to the corresponding pixel circuit 320. The individual biases VE11 and VE12 are supplied because different reference voltages VREF11 and VREF12 are supplied to the respective individual bias circuits 310, and outputs of the bias circuits are determined on the basis of the respective reference voltages, as described above. On the other hand, the pixel circuits 320 of all the pixels are commonly connected to the common bias circuit 240. The common bias circuit 240 supplies a common bias potential as an anode potential VA to the anodes of the SPADs 340 of all the pixels.

While the common bias potential (the anode potential VA) is supplied to the anodes of all the pixels, an individual bias potential VE is supplied to the cathode for each pixel. The individual bias potential VE is controlled to a value corresponding to a breakdown voltage of the SPAD 340 for each pixel.

A circuit including the individual bias circuit 310 and the common bias circuit 240 for each pixel functions as a voltage control unit 305 that adjusts a reverse bias voltage between the anode and the cathode for each pixel. By adjusting the reverse bias voltage between the anode and the cathode for each pixel, a variation in PDE (in other words, sensitivity) for each pixel can be corrected to suppress shading noise.

[Operation Example of Distance Measuring Module]

Figure 15:
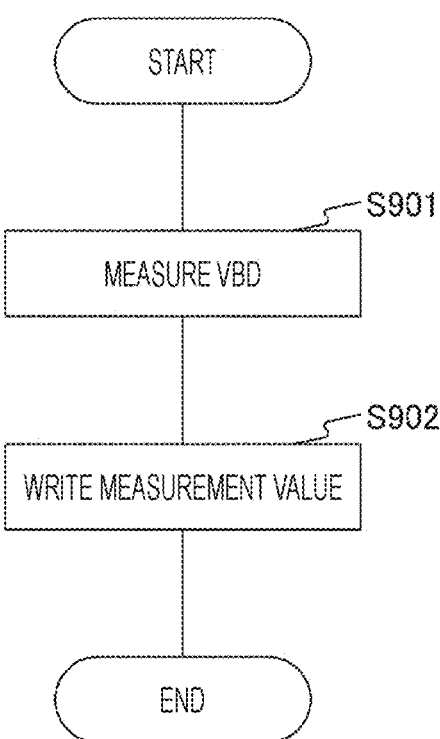
FIG. 15 is a flowchart illustrating an example of a measurement process at the time of shipment in the first embodiment of the present technology.

FIG. 15 is a flowchart illustrating an example of a measurement process at the time of shipment in the first embodiment of the present technology. The measurement process at the time of shipment is carried out, for example, at the time of shipment. The distance measuring module 100 measures a breakdown voltage VBD for each pixel (step S901), and writes a measurement value together with a target value into the measurement value storage unit 223 (step S902). For example, a target value of the bottom potential VS and a target value of the excess bias voltage VEX are written into the measurement value storage unit 223. After the step S902, the distance measuring module 100 ends the measurement process at the time of shipment.

Figure 16:
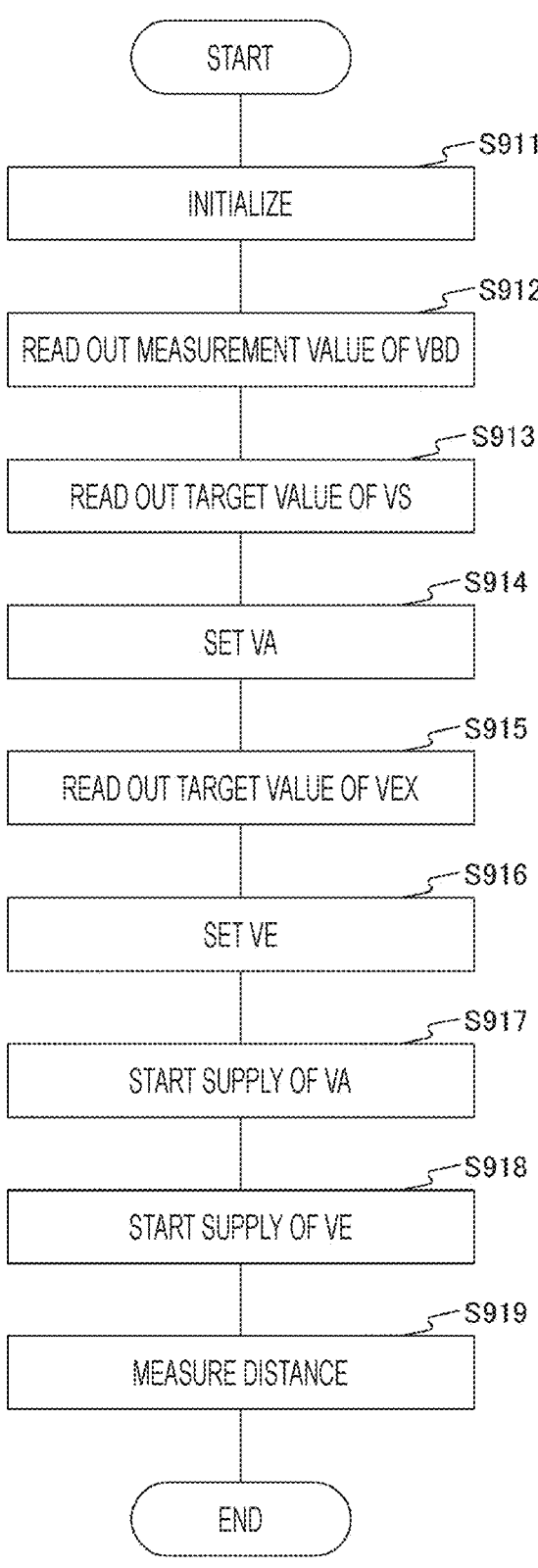
FIG. 16 is a flowchart illustrating an example of a distance measuring process in the first embodiment of the present technology.

FIG. 16 is a flowchart illustrating an example of a distance measuring process in the first embodiment of the present technology. The distance measuring process is started, for example, when a predetermined application for generating a distance image is executed after shipment.

The bias voltage setting unit 224 initializes an individual bias potential VE and a common bias potential (an anode potential VA) (step S911). Then, the bias voltage setting unit 224 reads out a measurement value of a breakdown voltage VBD for each pixel from the measurement value storage unit 223 (step S912), and reads out a target value VSt of a bottom potential VS (step S913).

The bias voltage setting unit 224 calculates a statistic (an average value $VBD_{AV}$, a sum, or the like) of the breakdown voltages VBD for the respective pixels, and sets an anode potential VA satisfying the following equation by controlling the common bias circuit 240 (step S914).

$$VA = VSt - VBD_{AV} \qquad \text{Equation 1}$$

Furthermore, the bias voltage setting unit 224 reads out a target value VEXt of an excess bias voltage VEX (step S915). Then, the bias voltage setting unit 224 sets an individual bias potential VE for each pixel satisfying the following equation by controlling the reference voltage supply unit 210 (step S916).

$$VExy = VSxy + VEXt = (VA + VBDxy) + VEXt \qquad \text{Equation 2}$$

A calculation result of Equation 1 is input to VA on the right side of Equation 2. In addition, a measurement value of a breakdown voltage at the address (x, y) is input to VBDxy on the right side of Equation 2.

The common bias circuit 240 starts the supply of the set anode potential VA (step S917), and the individual bias circuit 310 starts the supply of the set individual bias potential VE (step S918). Then, the distance measuring module 100 starts measuring a distance (step S919). After the step S919, the distance measuring module 100 ends the distance measuring process.

Note that, although it has been described that the same anode potential VA is supplied to all the pixels, an individual anode potential corresponding to a breakdown voltage of each pixel can be supplied to each pixel. In this case, a bias circuit similar to the common bias circuit 240 is provided for each pixel and connected to the anode of each pixel. Then, an individual anode potential is supplied for each pixel, using the following expression instead of Equation 1.

$$VAxy = VSt - VBDxy$$

As described above, according to the first embodiment of the present technology, since the voltage control unit 305 adjusts a reverse bias voltage for each pixel to a value corresponding to a breakdown voltage of each pixel, it is possible to correct a variation in sensitivity caused by a variation in breakdown voltage for each pixel. By correcting the variation in sensitivity, shading noise can be suppressed, and the variation in distance measurement accuracy in a distance image can be reduced.

First Modification

In the first embodiment described above, the common bias circuit 240 applies a common bias potential to the anodes. In this configuration, however, the common bias circuit 240 is required, and a circuit scale of the distance measuring module 100 increases accordingly. A first modification of the first embodiment is different from the first embodiment in that the common bias circuit 240 is not arranged in the solid-state imaging element 200.

Figure 17:
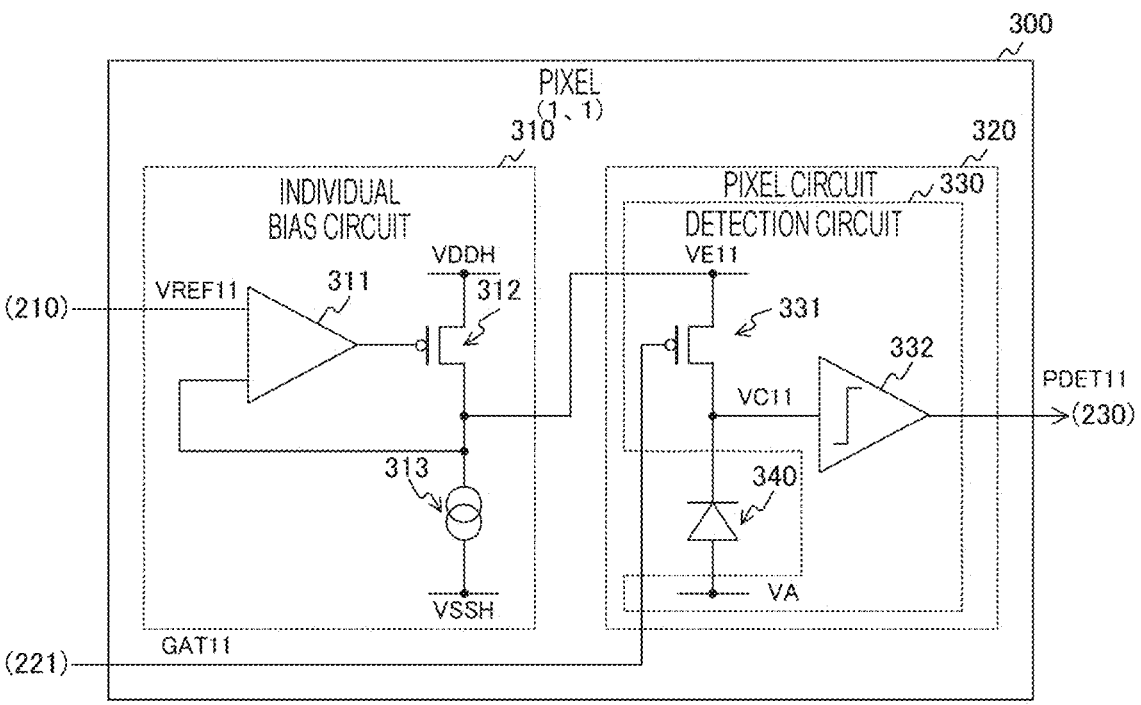
FIG. 17 is a circuit diagram illustrating a configuration example of a pixel in a first modification of the first embodiment of the present technology.

FIG. 17 is a circuit diagram illustrating a configuration example of a pixel 300 in the first modification of the first embodiment of the present technology. In the first modification of the first embodiment, the common bias circuit 240 is not arranged, and a predetermined anode potential VA is applied to the anodes of the SPADs 340 of all the pixels. By eliminating the common bias circuit 240, it is possible to reduce a circuit scale of the distance measuring module 100.

As described above, in the first modification of the first embodiment of the present technology, since the common bias circuit 240 is eliminated, the circuit scale of the distance measuring module 100 can be reduced.

Second Modification

In the first modification of the first embodiment described above, the voltage control unit 305 adjusts an individual bias potential for each pixel. In this configuration, however, it is necessary to arrange an individual bias circuit 310 for each pixel, making it difficult to increase the number of pixels. A second modification of the first embodiment is different from the first modification of the first embodiment in that an individual bias circuit 310 is arranged for each pixel block in the solid-state imaging element 200.

Figure 18:
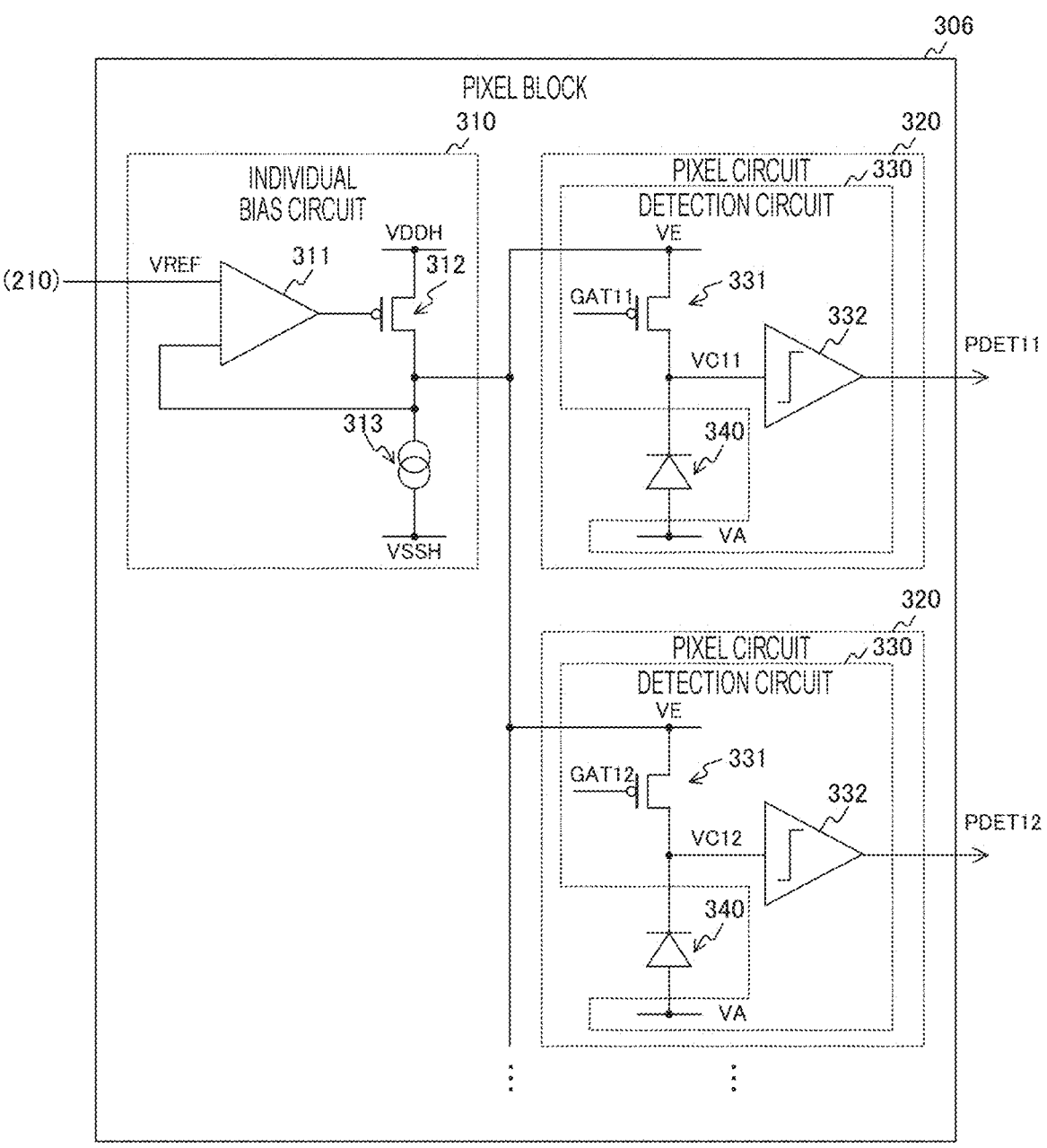
FIG. 18 is a circuit diagram illustrating a configuration example of a pixel block in a second modification of the first embodiment of the present technology.

FIG. 18 is a circuit diagram illustrating a configuration example of a pixel block 306 in the second modification of the first embodiment of the present technology. In the second modification of the first embodiment, the pixel array unit 222 is divided into a plurality of pixel blocks 306. In each of the pixel blocks 306, a predetermined number of pixel circuits 320 and one individual bias circuit 310 are arranged. For example, four pixel circuits 320 in 2 rows×2 columns are arranged for each pixel block 306.

The individual bias circuit 310 is commonly connected to the pixel circuits 320 in the same pixel block 306 to supply an individual bias potential VE to those pixel circuits 320. In this way, the individual bias potential VE is adjusted for each pixel block 306. The individual bias VE is supplied for each pixel block because different reference voltages VREF are supplied to the respective pixel blocks, and outputs of the bias circuits are determined on the basis of the respective reference voltages.

Figure 19:
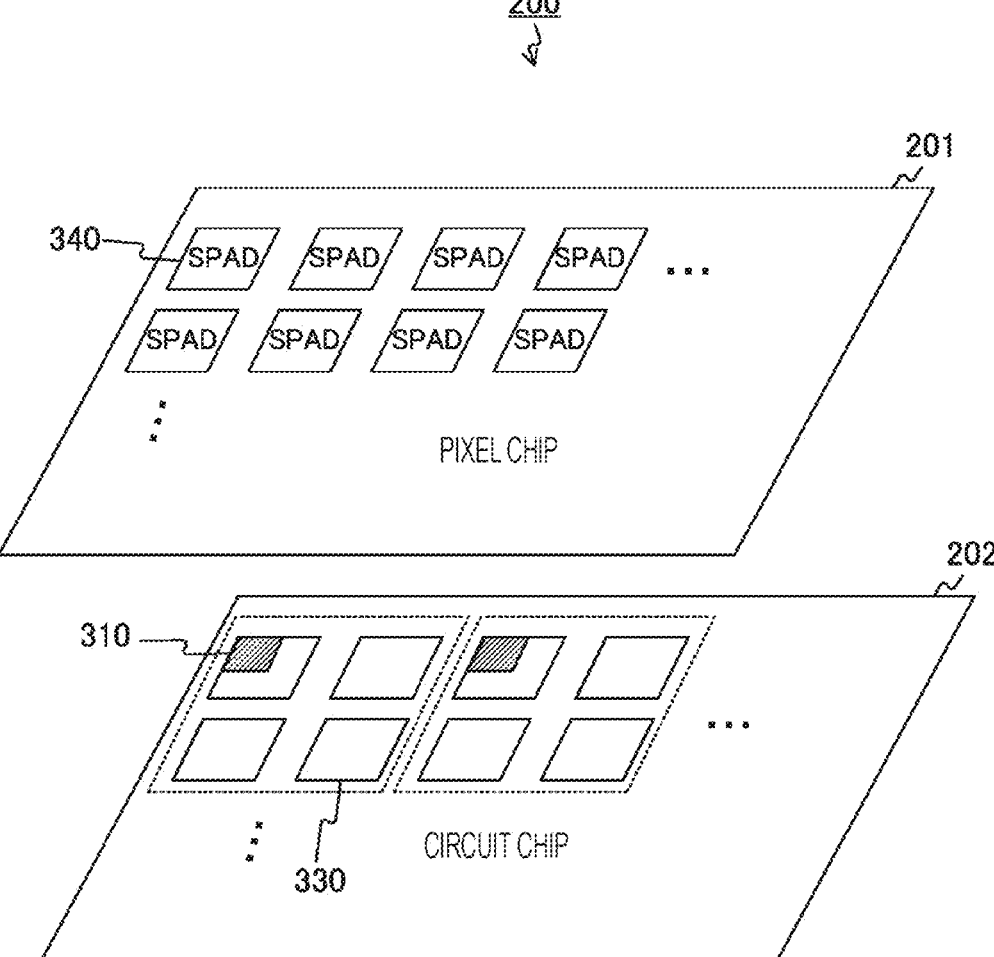
FIG. 19 is a diagram illustrating an arrangement example of circuits and elements for each chip in the second modification of the first embodiment of the present technology.

FIG. 19 is a diagram illustrating an arrangement example of circuits and elements for each chip in the second modification of the first embodiment of the present technology. As illustrated in FIG. 19, a predetermined number (e.g., four) of detection circuits 330 and individual bias circuits 310 are arranged for each pixel block 306 in the circuit chip 202. In FIG. 19, a region surrounded by a dotted line indicates a region corresponding to the pixel block 306. By arranging the individual bias circuit 310 for each pixel block 306, it is possible to reduce a circuit scale of each pixel as compared with that in a case where the individual bias circuit 310 is arranged for each pixel. As a result, it is easy to increase the number of pixels.

As described above, in the second modification of the first embodiment of the present technology, since the individual bias circuit 310 is arranged for each pixel block 306, the circuit scale can be reduced as compared with that in a case where the individual bias circuit 310 is arranged for each pixel.

Third Modification

In the first modification of the first embodiment described above, the voltage control unit 305 adjusts an individual bias potential for each pixel. In this configuration, however, it is necessary to arrange an individual bias circuit 310 for each pixel, making it difficult to increase the number of pixels. A third modification of the first embodiment is different from the first modification of the first embodiment in that an individual bias circuit 310 is arranged for each line in the solid-state imaging element 200.

Figure 20:
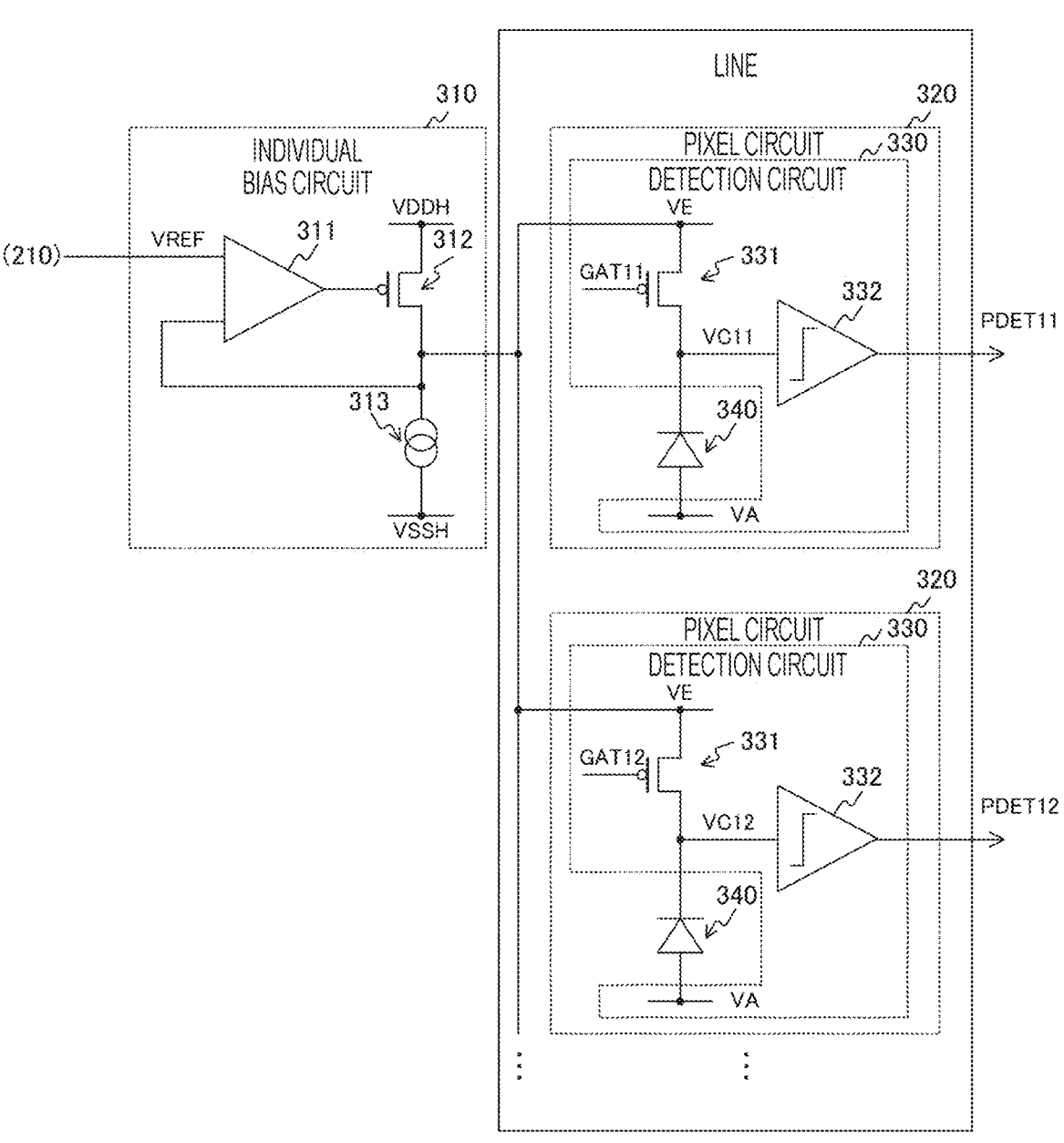
FIG. 20 is a circuit diagram illustrating a configuration example between an individual bias circuit and a line in a third modification of the first embodiment of the present technology.

FIG. 20 is a circuit diagram illustrating a configuration example of a pixel block 306 in the third modification of the first embodiment of the present technology. In the third modification of the first embodiment, a plurality of lines is arranged in the pixel array unit 222. In each of these lines, pixel circuits 320 are arranged in a predetermined direction (e.g., a horizontal direction). Also, an individual bias circuit 310 is arranged for each line. The individual bias circuit 310 is commonly connected to each of the pixel circuits 320 in the corresponding line to supply an individual bias potential VE to the pixel circuits 320. In this way, the individual bias potential VE is adjusted for each line. Note that the pixel circuits 320 can also be arranged for each line in the vertical direction. The individual bias VE is supplied for each line because different reference voltages VREF are supplied to the respective lines, and outputs of the bias circuits are determined on the basis of the respective reference voltages.

Figure 21:
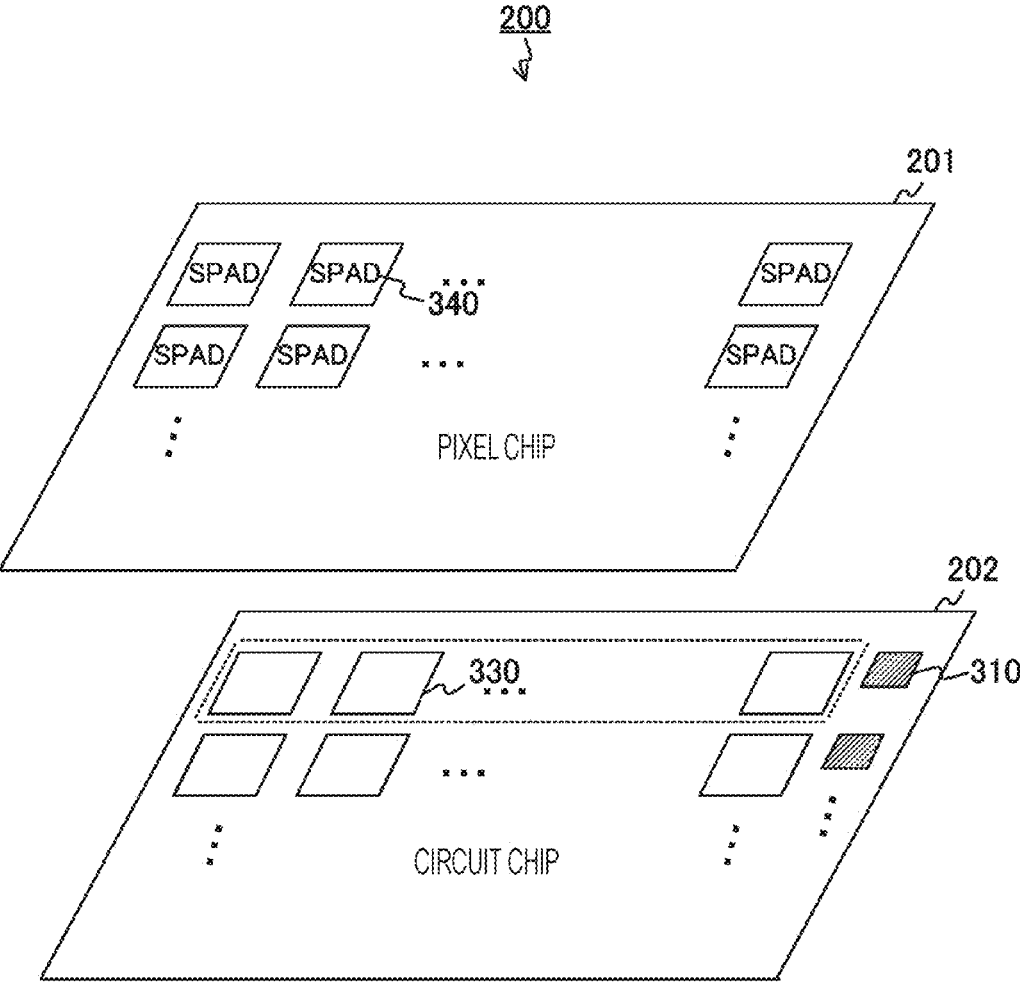
FIG. 21 is a diagram illustrating an arrangement example of circuits and elements for each chip in the third modification of the first embodiment of the present technology.

FIG. 21 is a diagram illustrating an arrangement example of circuits and elements for each chip in the third modification of the first embodiment of the present technology. As illustrated in FIG. 21, an individual bias circuit 310 is arranged for each line in the circuit chip 202. In FIG. 21, a region surrounded by a dotted line indicates a region corresponding to the line. By arranging the individual bias circuit 310 for each line, it is possible to reduce a circuit scale of each pixel as compared with that in a case where the individual bias circuit 310 is arranged for each pixel. As a result, it is easy to increase the number of pixels.

Note that, as illustrated in FIG. 21, if the individual bias circuit 310 is arranged only on one side of the line, heat may be generated from the individual bias circuit 310 intensively at that location. Since the PDE may vary due to fluctuations in temperature, it is preferable that heat distribution on the chip is uniform.

Figure 22:
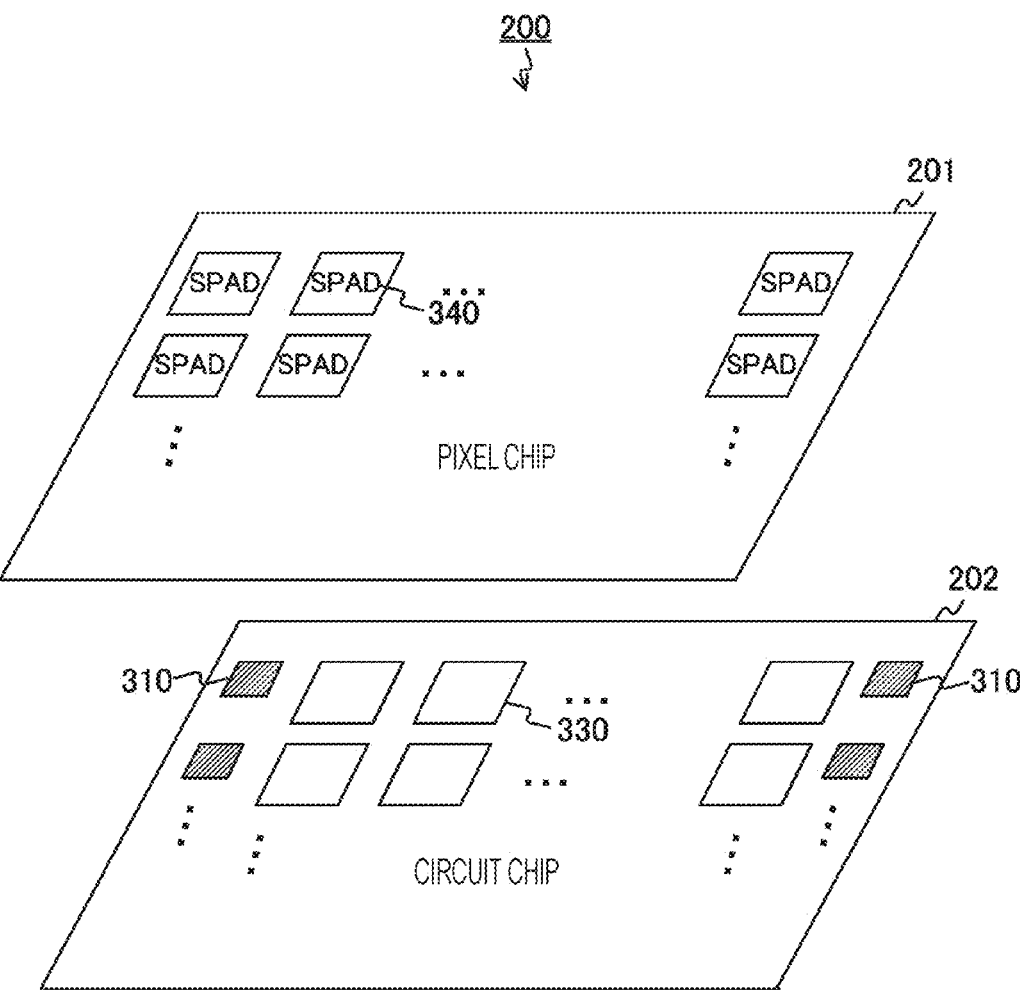
FIG. 22 is a diagram illustrating another arrangement example of circuits and elements for each chip in the third modification of the first embodiment of the present technology.

Therefore, the individual bias circuit 310 can be arranged at a position where heat distribution is not biased. For example, as illustrated in FIG. 22, individual bias circuits 310 can be arranged on both sides of each line. In this case, half of the pixels in the line are connected to the right individual bias circuit 310, and the remaining pixels are connected to the left individual bias circuit 310. Alternatively, an individual bias circuit 310 may be arranged at one of both side ends (e.g., a left side end) of an odd-numbered line, and another individual bias circuit 310 may be arranged at the other of both side ends (e.g., a right side end) of an even-numbered line.

As described above, in the third modification of the first embodiment of the present technology, since the individual bias circuit 310 is arranged for each line, the circuit scale can be reduced as compared with that in a case where the individual bias circuit 310 is arranged for each pixel.

Fourth Modification

In the first modification of the first embodiment described above, the individual bias circuit 310 supplies an individual bias potential VE to the cathode. However, the individual bias circuit 310 can also supply an individual bias potential to the anode. A fourth modification of the first embodiment is different from the first embodiment in that the individual bias circuit 310 supplies an individual bias potential to the anode in the solid-state imaging element 200.

Figure 23:
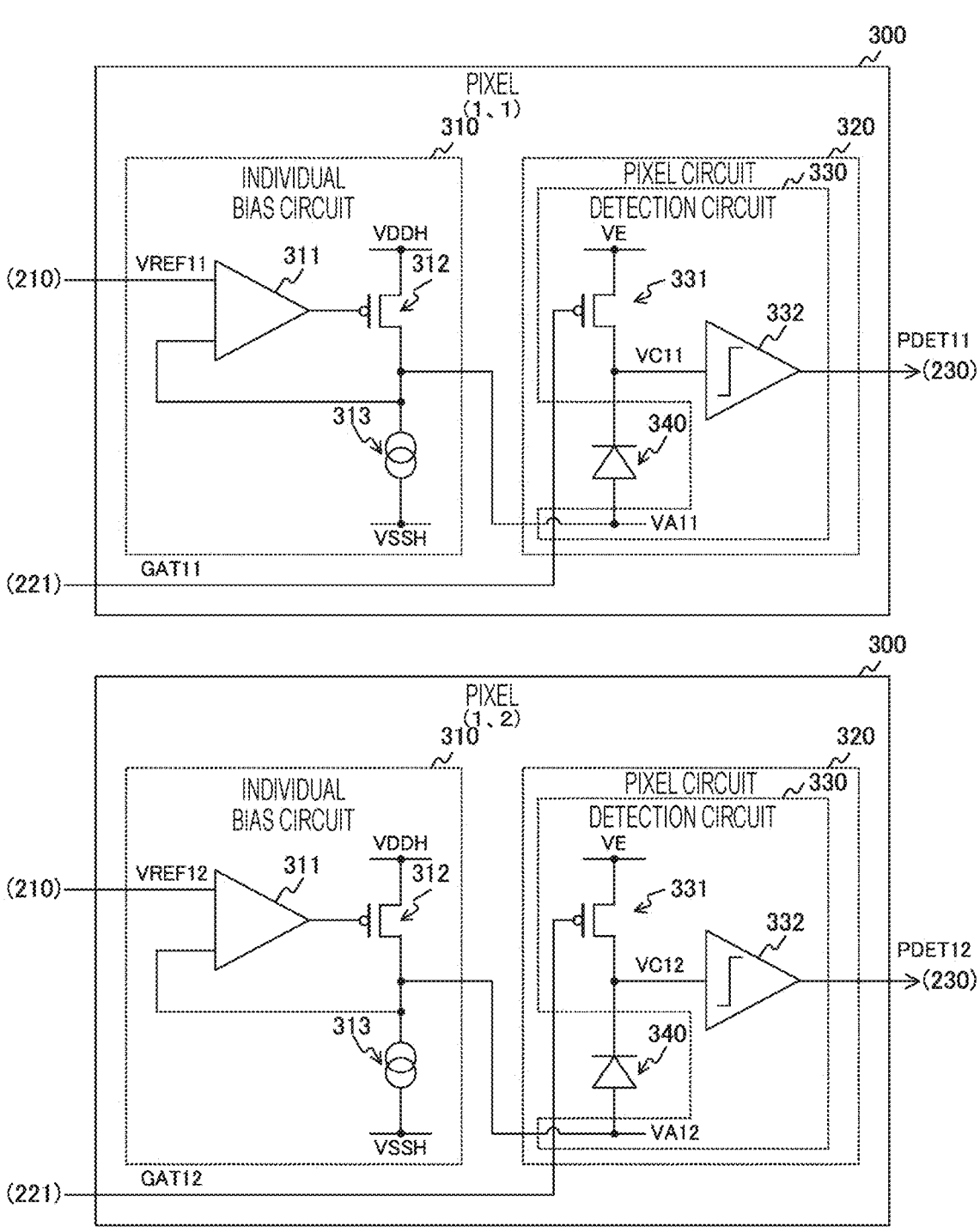
FIG. 23 is a circuit diagram illustrating a configuration example of a pixel in a fourth modification of the first embodiment of the present technology.

FIG. 23 is a circuit diagram illustrating a configuration example of a pixel 300 in the fourth modification of the first embodiment of the present technology. In the fourth modification of the first embodiment, the individual bias circuit 310 supplies an individual bias potential VA (e.g., VA11 or VA12) to the anode of the SPAD 340. The individual biases VA11 and VA12 are supplied because different reference voltages VREF11 and VREF12 are supplied to the respective individual bias circuits 310, and outputs of the bias circuits are determined on the basis of the respective reference voltages. In this way, the potential of the anode is adjusted for each pixel. On the other hand, a potential common to all the pixels is applied as VE to the cathodes.

Note that a common bias circuit 240 can be further added. In this case, the common bias circuit 240 supplies the common bias potential as VE to the cathodes of all the pixels.

As described above, according to the fourth modification of the first embodiment of the present technology, since the individual bias circuit 310 supplies an individual bias potential to the anode, the potential of the anode can be adjusted for each pixel.

Fifth Modification

In the fourth modification of the first embodiment described above, the voltage control unit 305 adjusts an individual bias potential for each pixel. In this configuration, however, it is necessary to arrange an individual bias circuit 310 for each pixel, making it difficult to increase the number of pixels. A fifth modification of the first embodiment is different from the fourth modification of the first embodiment in that an individual bias circuit 310 is arranged for each pixel block in the solid-state imaging element 200.

Figure 24:
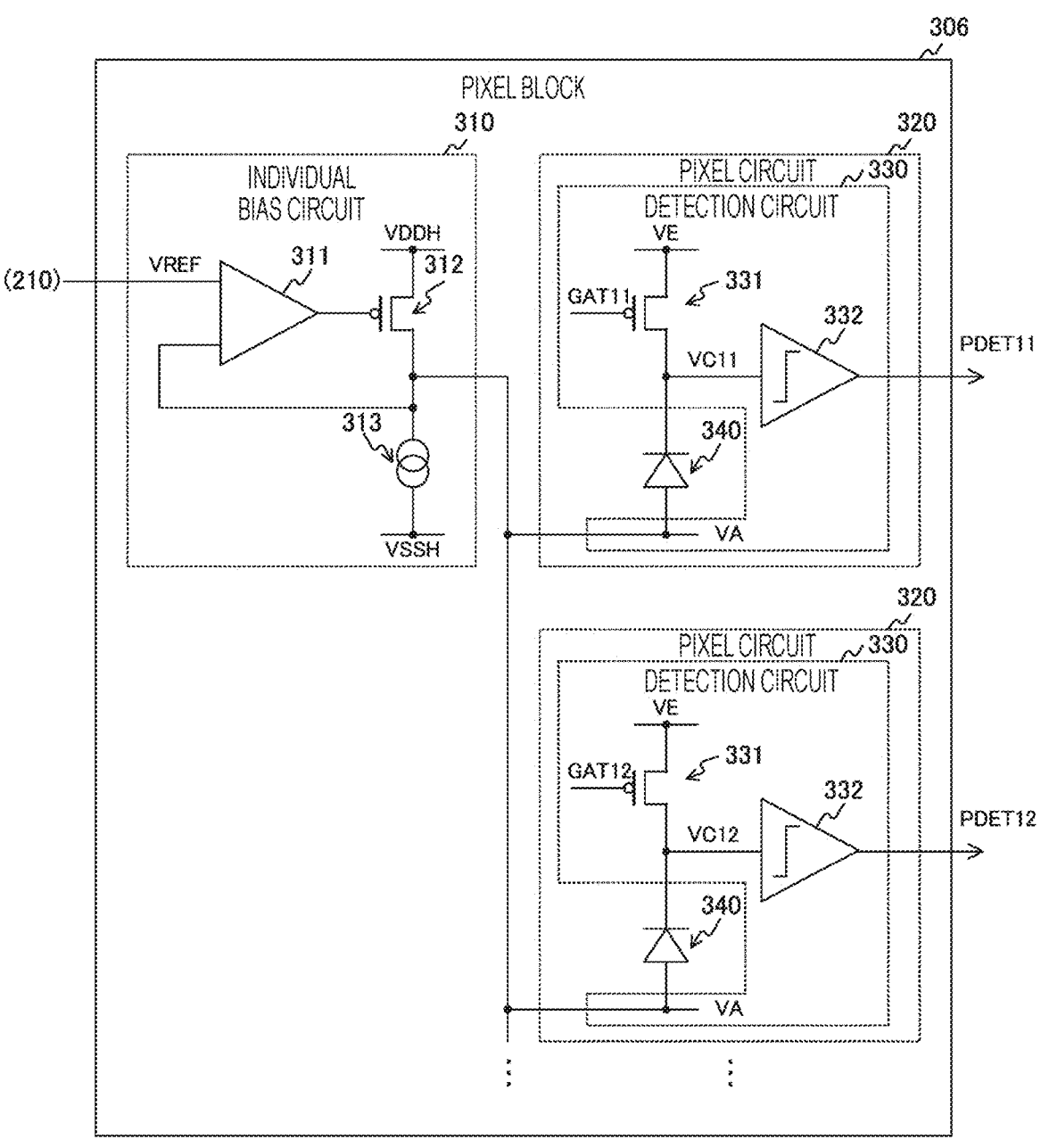
FIG. 24 is a circuit diagram illustrating a configuration example of a pixel block in a fifth modification of the first embodiment of the present technology.

FIG. 24 is a circuit diagram illustrating a configuration example of a pixel block 306 in the fifth modification of the first embodiment of the present technology. The fifth modification of the first embodiment is different from the fourth modification in that the pixel array unit 222 is divided into a plurality of pixel blocks 306. In each of the pixel blocks 306, a predetermined number of pixel circuits 320 and one individual bias circuit 310 are arranged.

By arranging the individual bias circuit 310 for each pixel block 306, it is possible to reduce a circuit scale of each pixel as compared with that in a case where the individual bias circuit 310 is arranged for each pixel. As a result, it is easy to increase the number of pixels.

Note that an individual bias circuit 310 supplying an individual bias potential to the anodes can be arranged for each line.

As described above, in the fifth modification of the first embodiment of the present technology, since the individual bias circuit 310 is arranged for each pixel block 306, the circuit scale can be reduced as compared with that in a case where the individual bias circuit 310 is arranged for each pixel.

2. Second Embodiment

In the first embodiment described above, the solid-state imaging element 200 sets an individual bias potential on the basis of a breakdown voltage measured in advance at the time of shipment. However, a value of the breakdown voltage may fluctuate depending on temperature after the shipment. A second embodiment is different from the first embodiment in that the solid-state imaging element 200 holds an error of a breakdown voltage with respect to a target value for each pixel after shipment.

Figure 25:
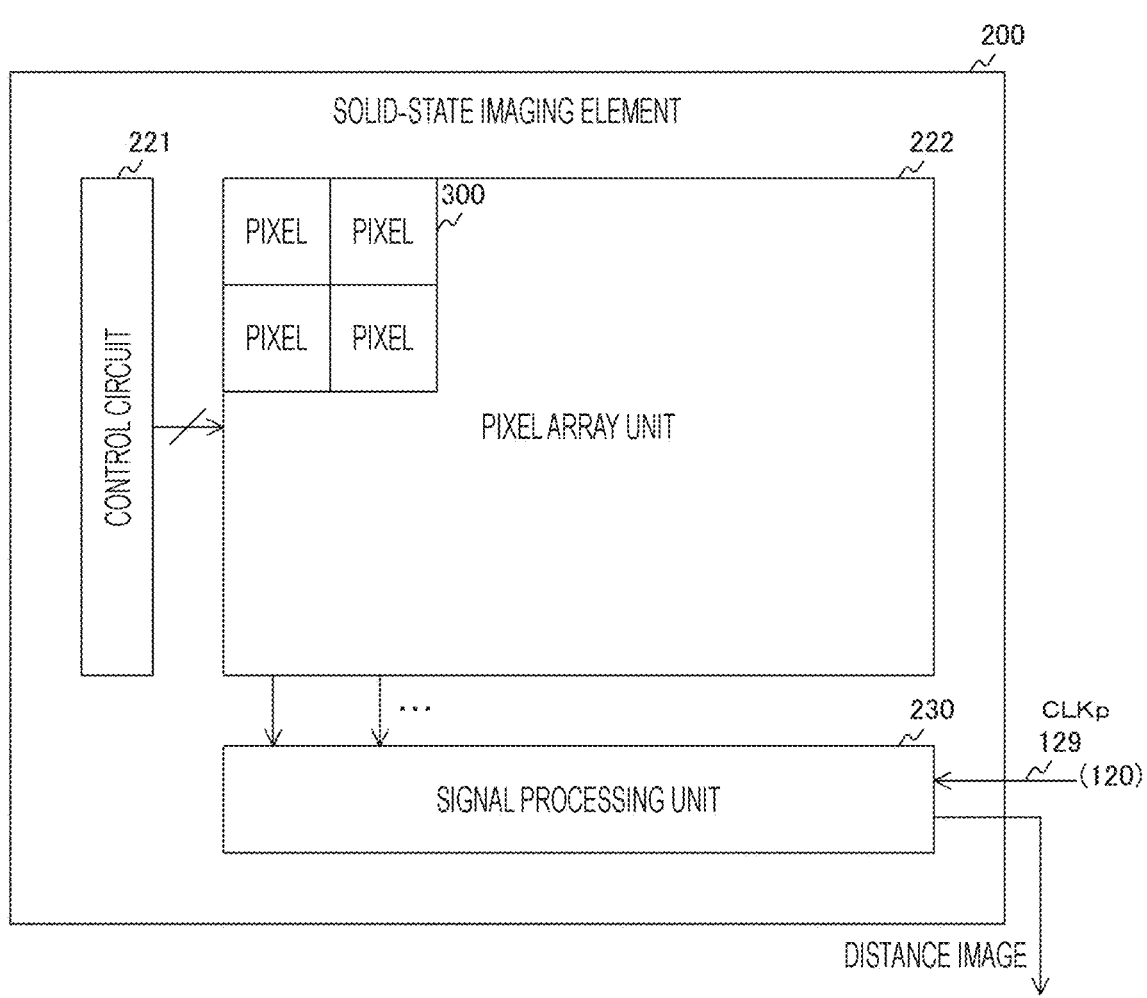
FIG. 25 is a block diagram illustrating a configuration example of a solid-state imaging element in a second embodiment of the present technology.

FIG. 25 is a block diagram illustrating a configuration example of a solid-state imaging element 200 in the second embodiment of the present technology. In the second embodiment, a control circuit 221, a pixel array unit 222, and a signal processing unit 230 are arranged in the solid-state imaging element 200. In the pixel array unit 222, a plurality of pixels 300 is arrayed in a two-dimensional lattice pattern.

Figure 26:
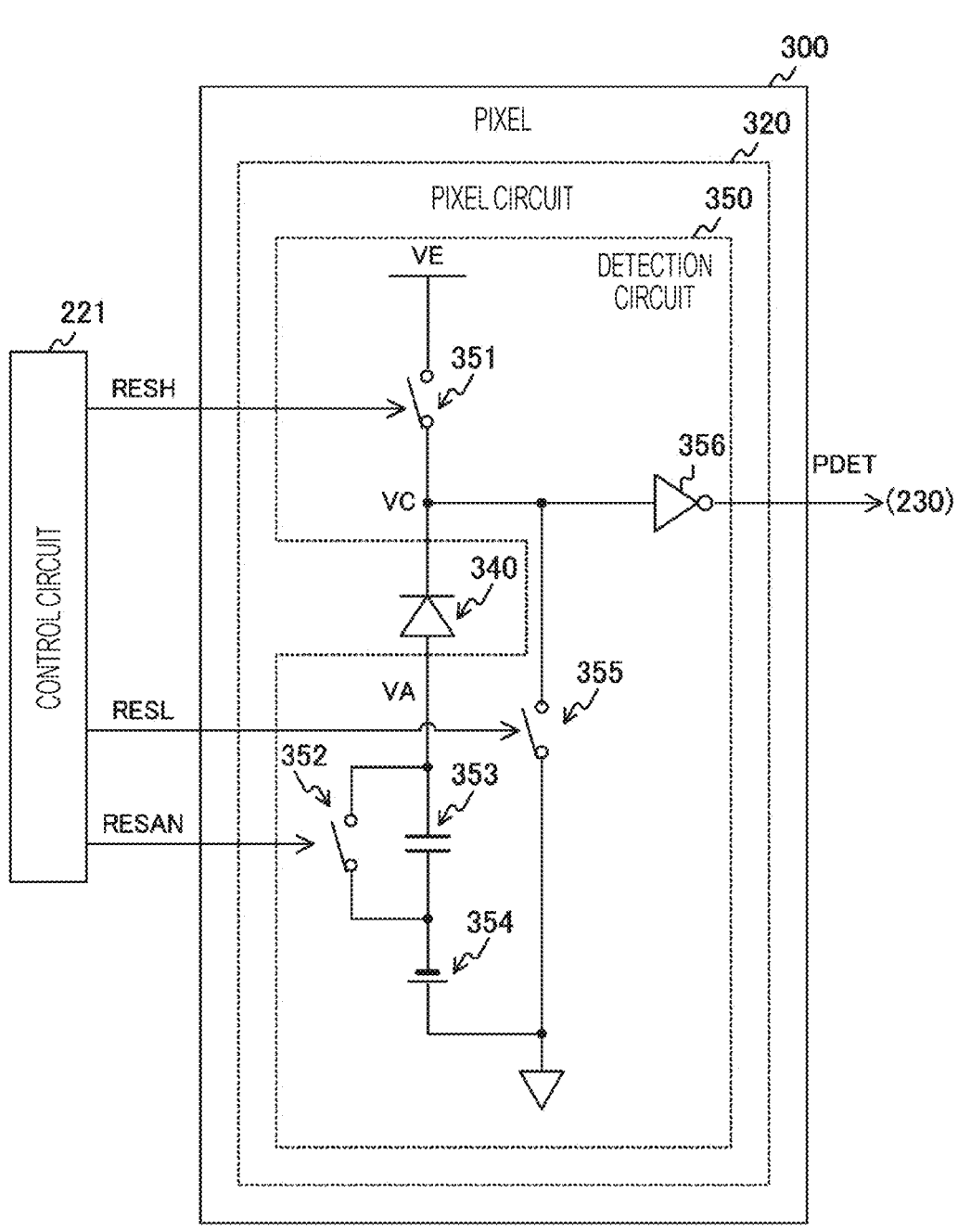
FIG. 26 is a circuit diagram illustrating a configuration example of a pixel according to the second embodiment of the present technology.

FIG. 26 is a circuit diagram illustrating a configuration example of a pixel 300 according to the second embodiment of the present technology. In the second embodiment, an SAPD 340 and a detection circuit 350 are arranged in the pixel 300. The detection circuit 350 includes a power reset switch 351, an anode reset switch 352, a capacitor 353, a low potential supply unit 354, a cathode reset switch 355, and an inverter 356.

The power reset switch 351 opens or closes a path between a potential VE and a cathode of the SPAD 340 according to a power reset signal RESH from the control circuit 221. For example, a power potential is used as the potential VE.

The capacitor 353 is inserted between the anode of the SPAD 340 and the low potential supply unit 354. The low potential supply unit 354 supplies a low potential VRLD lower than a predetermined reference potential (e.g., 0 volt) to one end of the capacitor 353. The other end of the capacitor 353 is connected to the anode of the SPAD 340.

The anode reset switch 352 opens or closes a path between both ends of the capacitor 353 according to an anode reset signal RESAN from the control circuit 221.

The cathode reset switch 355 opens or closes a path between the cathode of the SPAD 340 and the reference potential according to a cathode reset signal RESL from the control circuit 221.

For example, nMOS transistors are used as the power reset switch 351, the anode reset switch 352, and the cathode reset switch 355. In this case, each of the switches shifts to a closed state in response to a high-level signal, and shifts to an opened state in response to a low-level signal.

The inverter 356 generates a pulse signal PDET on the basis of a potential of the cathode of the SPAD 340. Note that the inverter 356 is an example of a logic gate described in the claims.

Note that the control circuit 221 is an example of a voltage control unit described in the claims.

Figure 27:
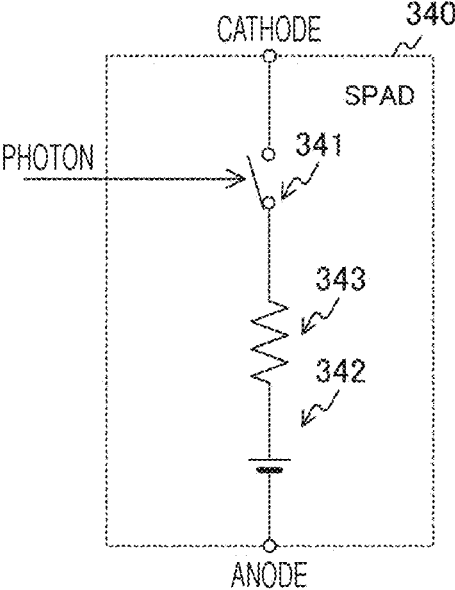
FIG. 27 is a circuit diagram illustrating an example of an equivalent circuit of an SPAD in the second embodiment of the present technology.

FIG. 27 is a circuit diagram illustrating an example of an equivalent circuit of the SPAD 340 in the second embodiment of the present technology. The equivalent circuit of the SPAD 340 is represented by, for example, a circuit in which a switch 341, an internal resistor 342, and a breakdown voltage supply unit 343 are connected to each other in series between the anode and the cathode.

The switch 341 shifts to a closed state to generate a photocurrent when a photon is incident. The breakdown voltage supply unit 343 supplies a breakdown voltage.

According to the configuration illustrated in FIG. 27, when a photon is incident, the switch 341 shifts to a closed state, and a photocurrent flows through the internal resistor 342. As a result, the potential of the cathode drops.

Figure 28:
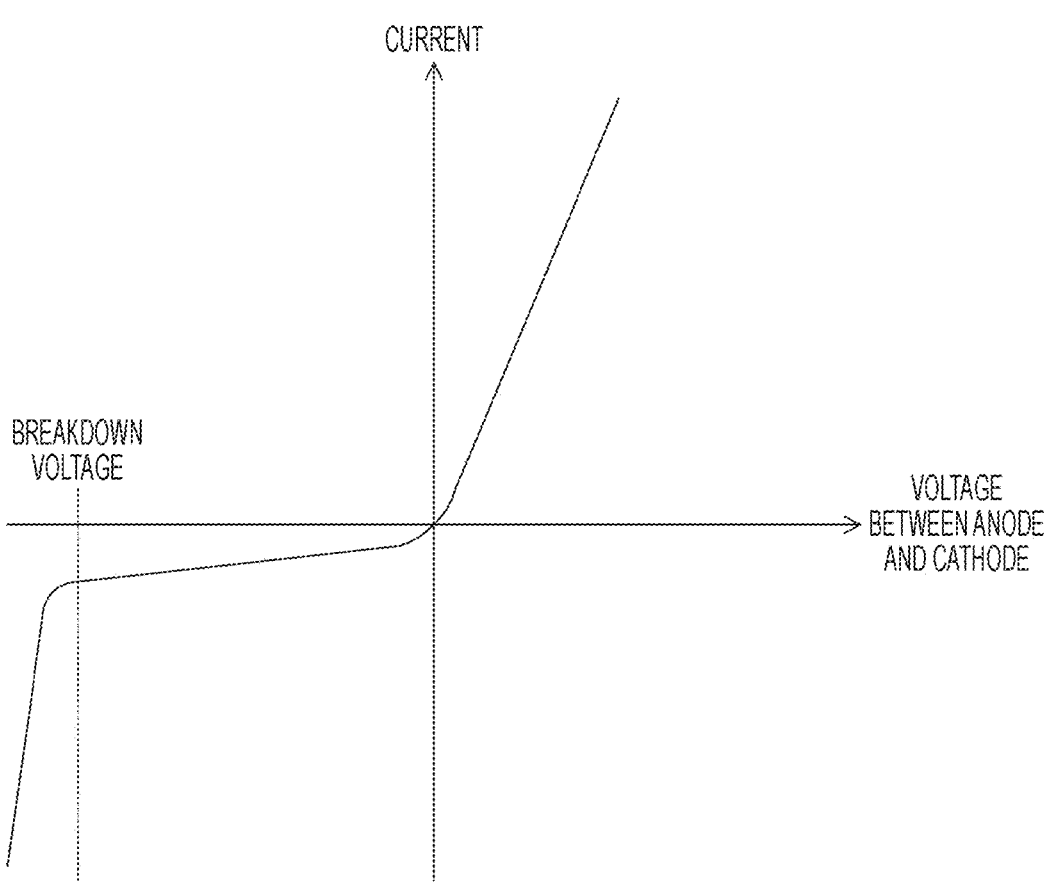
FIG. 28 is a graph illustrating an example of voltage-current characteristics of the SPAD in the second embodiment of the present technology.

FIG. 28 is a graph illustrating an example of voltage-current characteristics of the SPAD 340 in the second embodiment of the present technology. In FIG. 28, the horizontal axis represents a voltage applied between the anode and the cathode of the SPAD 340, and the vertical axis represents a photocurrent from the SPAD 340. In a case of operating in the Geiger mode, a voltage at a negative value, that is, a reverse bias voltage is applied as the voltage between the anode and cathode of the SPAD 340. When the reverse bias voltage is lower than a predetermined breakdown voltage, an avalanche breakdown occurs in the SPAD 340, and a photocurrent is amplified. When a voltage lower than the breakdown voltage by several volts is applied between the anode and the cathode, the gain in the amplification becomes substantially infinite, and one photon can be detected.

Figure 29:
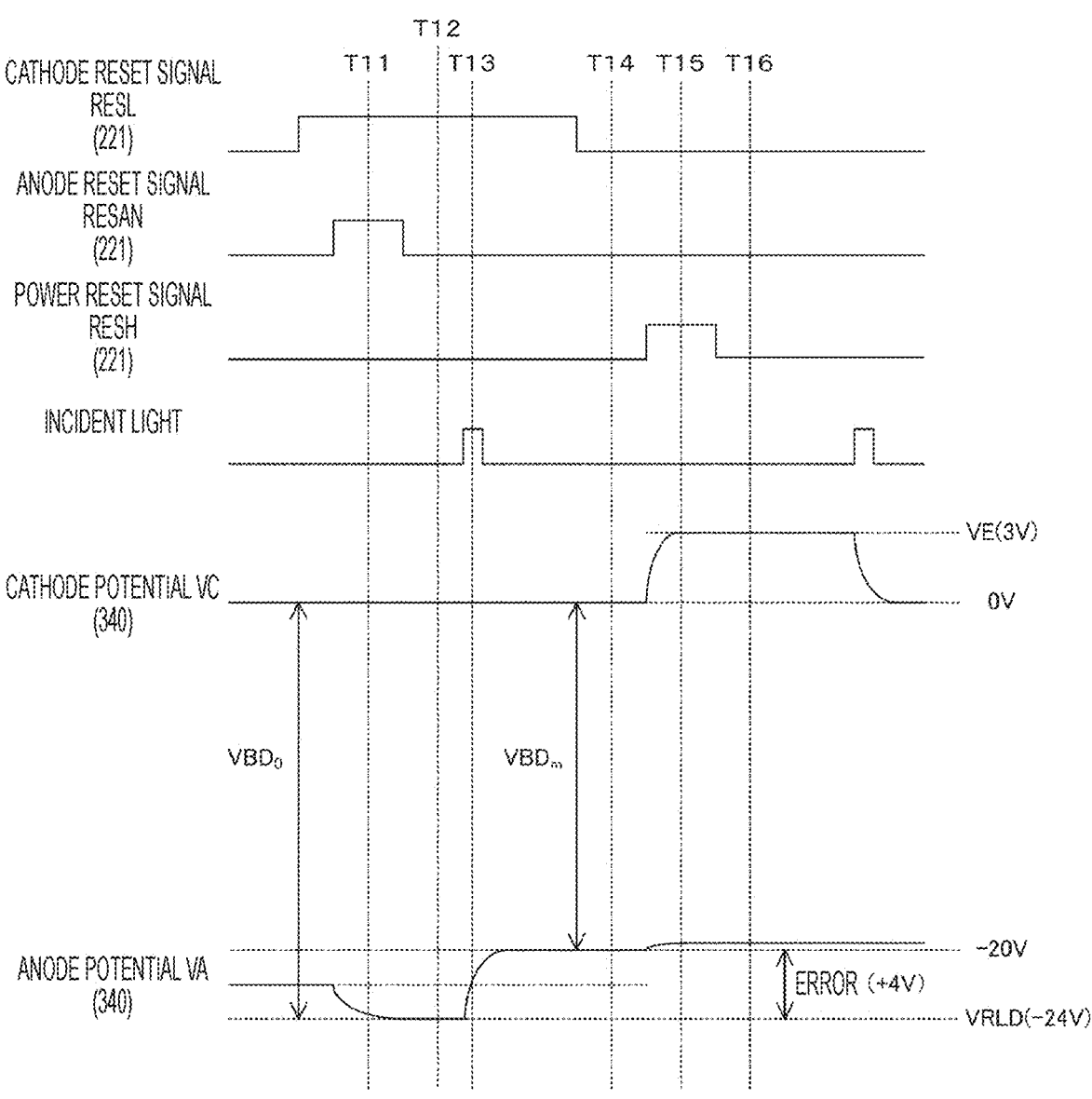
FIG. 29 is a timing chart illustrating an example of an operation of a control circuit in the second embodiment of the present technology.

FIG. 29 is a timing chart illustrating an example of an operation of the control circuit 221 in the second embodiment of the present technology. At timing T11 before the shift to the Geiger mode, the control circuit 221 supplies a high-level anode reset signal RESAN over a pulse period while setting the cathode reset signal RESL to a high level. At this time, the power reset signal RESH is at a low level.

By the control at the timing T1, for example, a predetermined reference potential (e.g., 0 volt) is applied to the cathode of the SPAD 340.

Then, at timing T12 when the pulse period has elapsed, the anode of the SPAD 340 reaches a predetermined low potential VRLD (e.g., -24 volts). A voltage (e.g., -24 volts) between the anode and the cathode at this time corresponds to a target value $VBD_0$ of the breakdown voltage.

Then, at timing T13, the light emitting unit 110 emits test light for measuring an error of the breakdown voltage for each pixel with respect to the target value $VBD_0$. At the time of emitting the test light, a subject (e.g., white paper) having uniform reflectance is provided in front of the distance measuring module 100, such that light reflected by the subject is incident on the solid-state imaging element 200. Alternatively, light from the outside of the distance measuring module 100 is blocked, and the test light from the light emitting unit 110 is reflected in the distance measuring module 100, such that the reflected light is incident on the solid-state imaging element 200.

The cathode potential VC of the SPAD 340 rises by the incident light and becomes, for example, -20 volts (V). Since no excess bias voltage is applied, a breakdown voltage $VBD_m$ occurs in each pixel between the anode and the cathode for the pixel. The pixels may vary in breakdown voltage $VBD_m$ due to a fluctuation in process or temperature, but an error (e.g., +4 volts) of the breakdown voltage $VBD_m$ with respect to the target value $VBD_0$ is held in the capacitor 353 for each pixel.

Then, at timing T14, the control circuit 221 cancels the reset of the cathode by returning the cathode reset signal RESL to the low level.

At timing T15 immediately after the timing T14, the control circuit 221 supplies a high-level power reset signal RESH over a pulse period. By this control, a potential VE (e.g., 3 volts) is applied to the anode of the SPAD 340. A voltage (e.g., 3 volts) between the potential VE and the reference potential is an excess bias voltage.

At the timing T15, the anode of the SPAD 340 remains at the potential (e.g., −20 volts) with the error (e.g., +4 volts). Therefore, a reverse bias voltage (e.g. 23 volts) between the potential (e.g., −20 volts) with the error and the potential VE (e.g., 3 volts) is applied between the anode and the cathode. That is, the reverse bias voltage is adjusted to a value corresponding to the breakdown voltage $VBD_m$ for each pixel.

At timing T16, the control circuit 221 returns the power reset signal RESH to the low level. The pixel circuit 320 shifts to the Geiger mode in which a photon is awaited to be incident. When a photon is incident in the Geiger mode, the potential of the anode drops.

Figure 30:
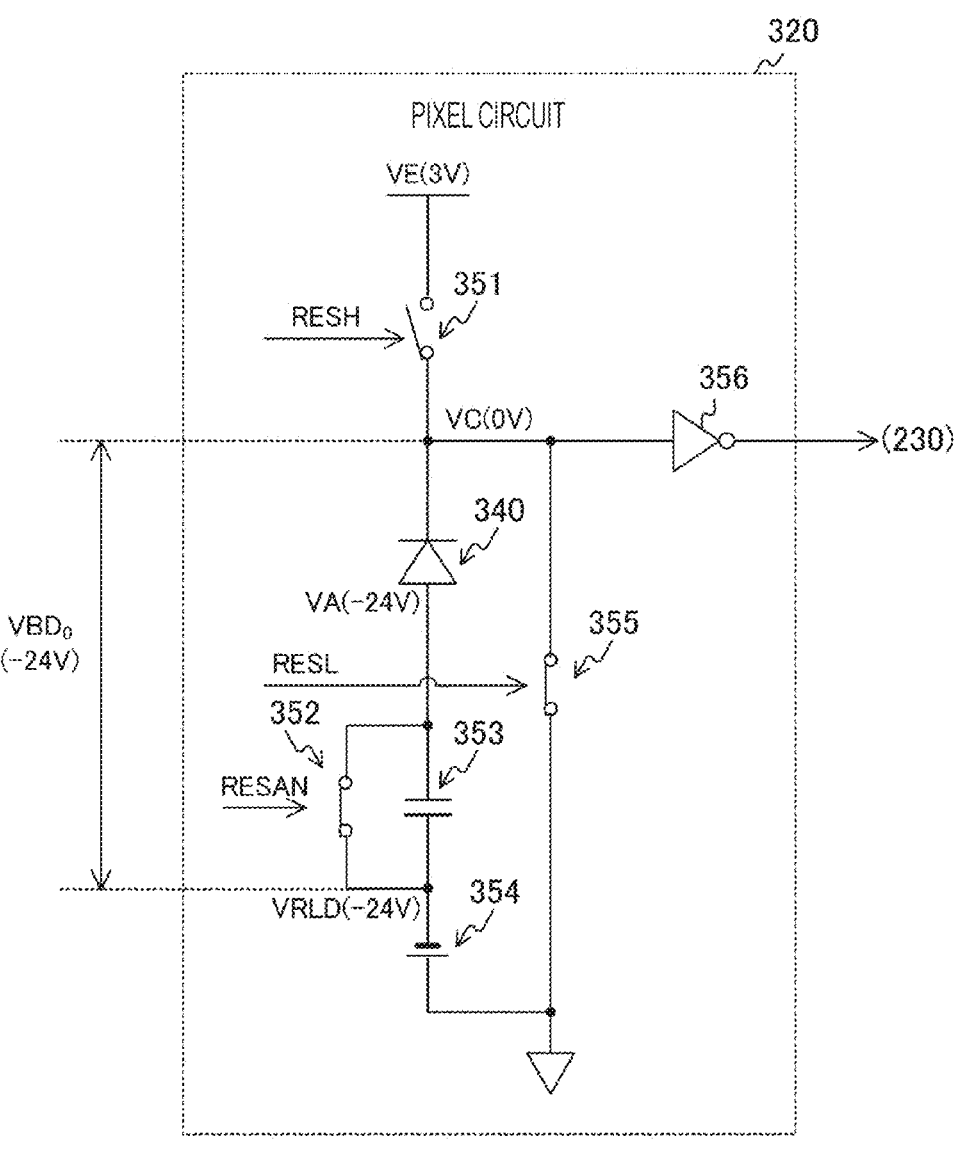
FIG. 30 is a circuit diagram illustrating an example of a state of a pixel circuit when an anode and a cathode are reset in the second embodiment of the present technology.

FIG. 30 is a circuit diagram illustrating an example of a state of the pixel circuit 320 when the anode and the cathode are reset in the second embodiment of the present technology. FIG. 30 illustrates a state of the pixel circuit 320 at the timing T11 of FIG. 29.

At the timing T11, the control circuit 221 controls the power reset switch 351 to be an opened state using a power reset signal RESH. Furthermore, the control circuit 221 controls both the anode reset switch 352 and the cathode reset switch 355 to be a closed state using an anode reset signal RESAN and a cathode reset signal RESL, respectively.

When the cathode reset switch 355 is in the closed state, the cathode of the SPAD 340 is initialized to a reference potential (e.g. 0 volt). Furthermore, when the anode reset switch 352 is in the closed state, a low potential VRLD (e.g., −24 volts) is applied to the anode of the SPAD 340. At this time, a voltage (e.g., −24 volts) applied between the anode and the cathode corresponds to a target value $VBD_0$ of the breakdown voltage.

Figure 31:
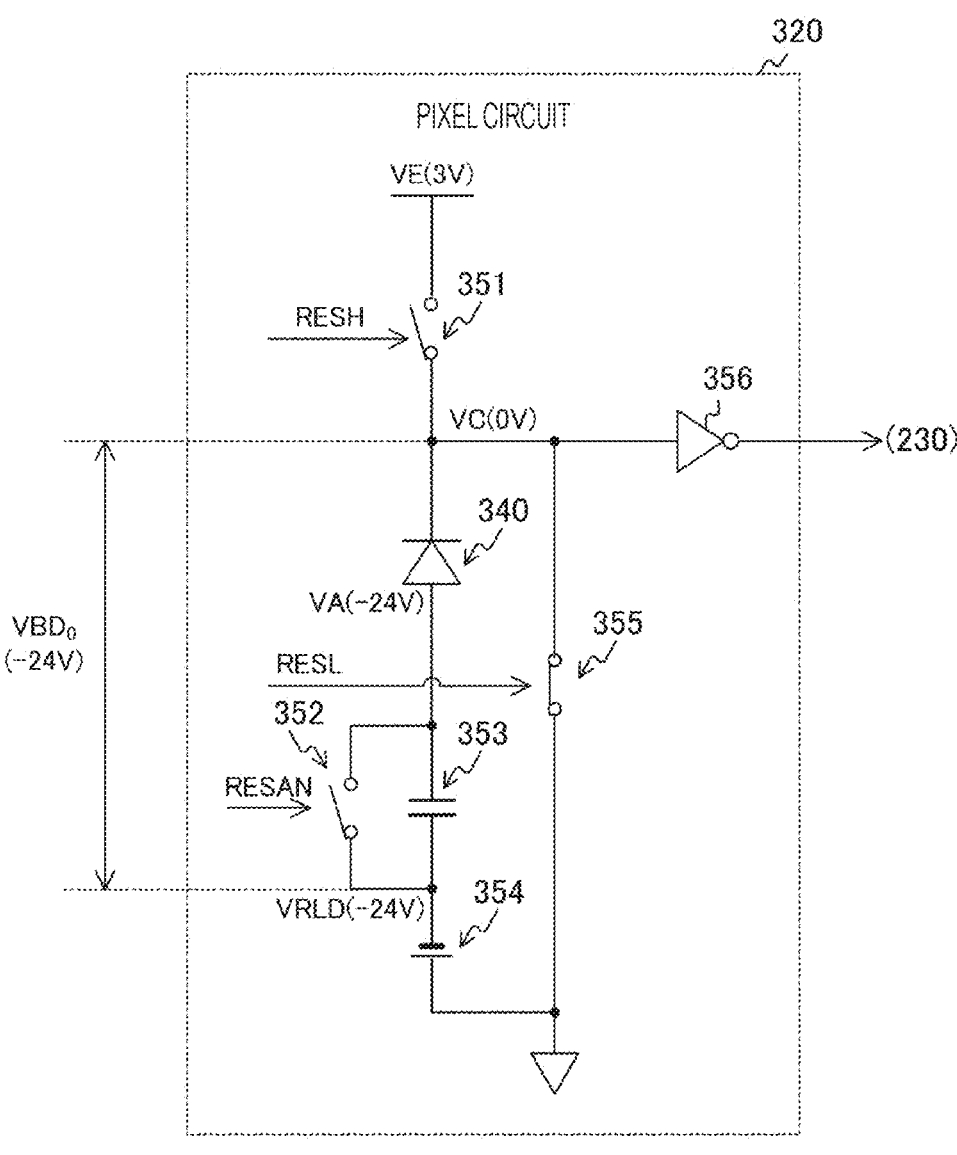
FIG. 31 is a circuit diagram illustrating an example of a state of the pixel circuit when the reset of the anode is canceled in the second embodiment of the present technology.

FIG. 31 is a circuit diagram illustrating an example of a state of the pixel circuit when the reset of the anode is canceled in the second embodiment of the present technology. FIG. 31 illustrates a state of the pixel circuit 320 at the timing T12 of FIG. 29.

At the timing T12, the control circuit 221 controls the anode reset switch 352 to be an opened state using an anode reset signal RESAN.

Figure 32:
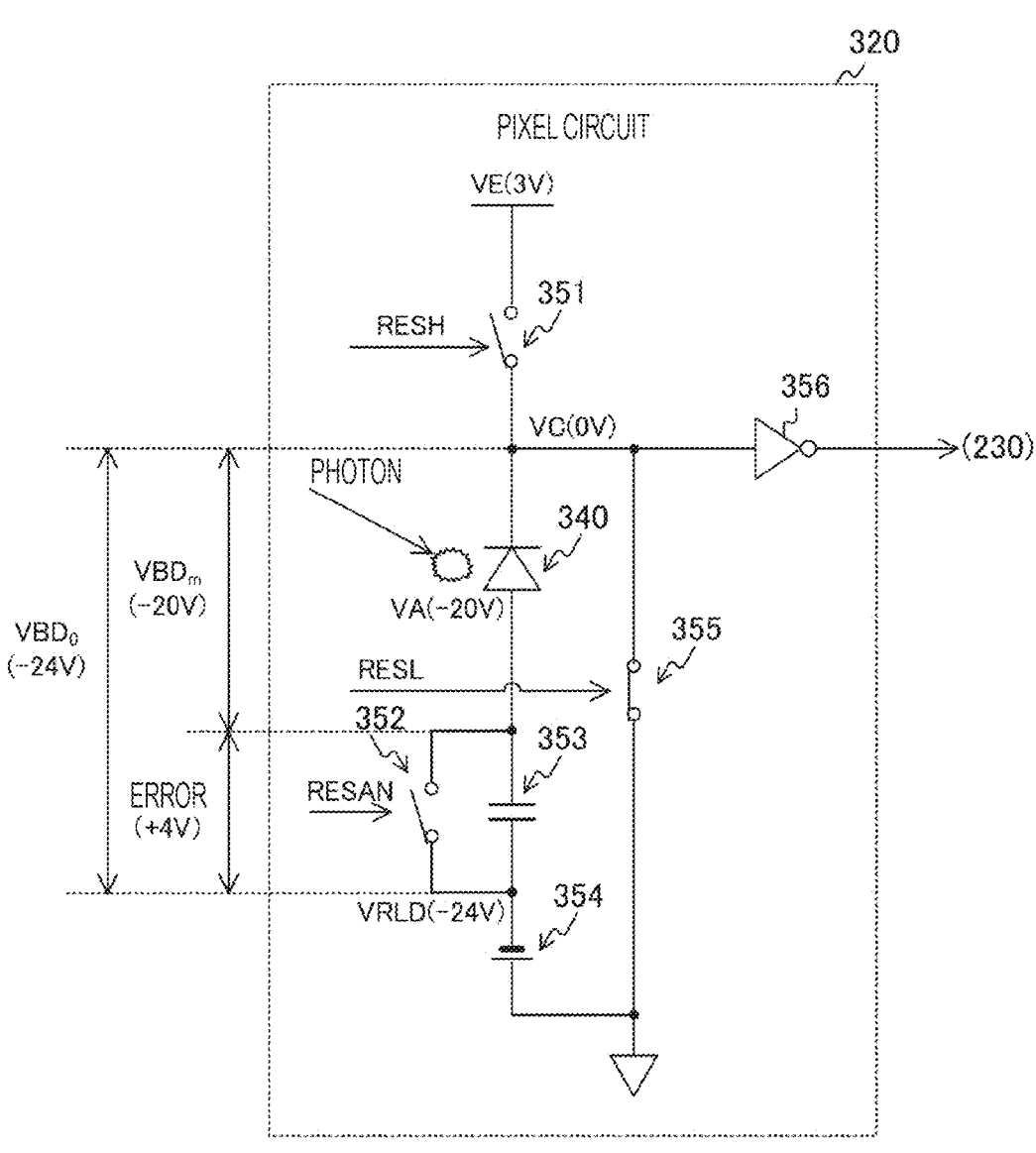
FIG. 32 is a circuit diagram illustrating an example of a state of the pixel circuit when an error is held in the second embodiment of the present technology.

FIG. 32 is a circuit diagram illustrating an example of a state of the pixel circuit 320 when an error is held in the second embodiment of the present technology. FIG. 32 illustrates a state of the pixel circuit 320 at the timing T13 of FIG. 29.

At the timing T13, reflected light of test light is incident. The anode potential VA of the SPAD 340 rises by the incident light and becomes, for example, −20 volts (V). Since no excess bias voltage is applied, a breakdown voltage $VBD_m$ occurs in each pixel between the anode and the cathode for the pixel. An error (e.g., +4 volts) of the breakdown voltage $VBD_m$ with respect to the target value $VBD_0$ is held in the capacitor 353 for each pixel.

Figure 33:
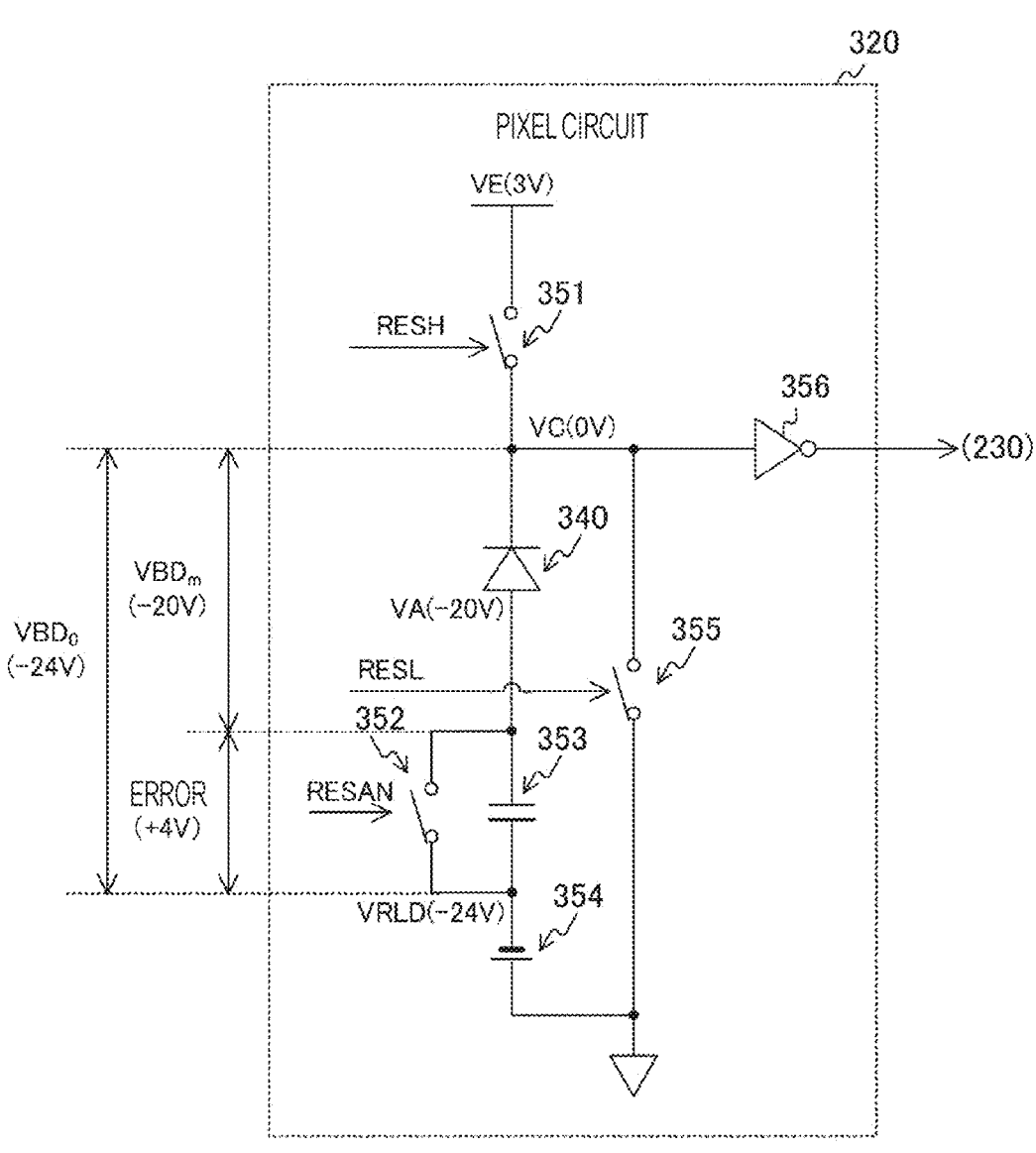
FIG. 33 is a circuit diagram illustrating an example of a state of the pixel circuit when the reset of the cathode is canceled in the second embodiment of the present technology.

FIG. 33 is a circuit diagram illustrating an example of a state of the pixel circuit 320 when the reset of the cathode is canceled in the second embodiment of the present technology. FIG. 33 illustrates a state of the pixel circuit 320 at the timing T14 of FIG. 29.

At the timing T14, the control circuit 221 controls the cathode reset switch 355 to be an opened state using a cathode reset signal RESL to cancel the reset of the cathode.

Figure 34:
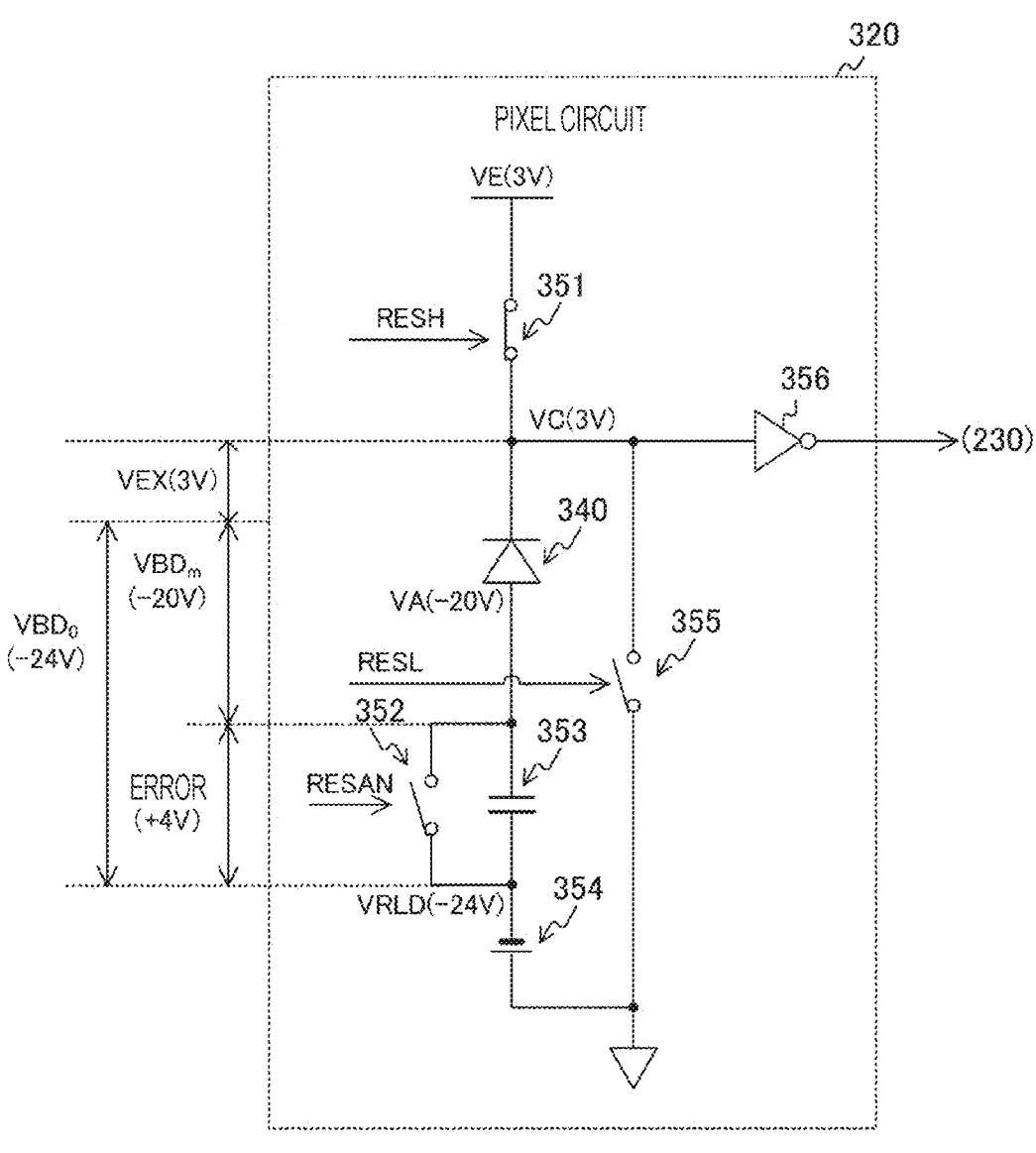
FIG. 34 is a circuit diagram illustrating an example of a state of the pixel circuit when an excess bias voltage is applied in the second embodiment of the present technology.

FIG. 34 is a circuit diagram illustrating an example of a state of the pixel circuit when an excess bias voltage is applied in the second embodiment of the present technology. FIG. 34 illustrates a state of the pixel circuit 320 at the timing T15 of FIG. 29.

At the timing T15, the control circuit 221 controls the power reset switch 351 to be a closed state using a power reset signal RESH. By this control, a potential VE (e.g., 3 volts) is applied to the anode of the SPAD 340. A voltage (e.g., 3 volts) between the potential VE and the reference potential is an excess bias voltage VEX.

At the timing T15, a reverse bias voltage (e.g. 23 volts) between a potential (e.g., −20 volts) with an error and a potential VE (e.g., 3 volts) is applied between the anode and the cathode.

Figure 35:
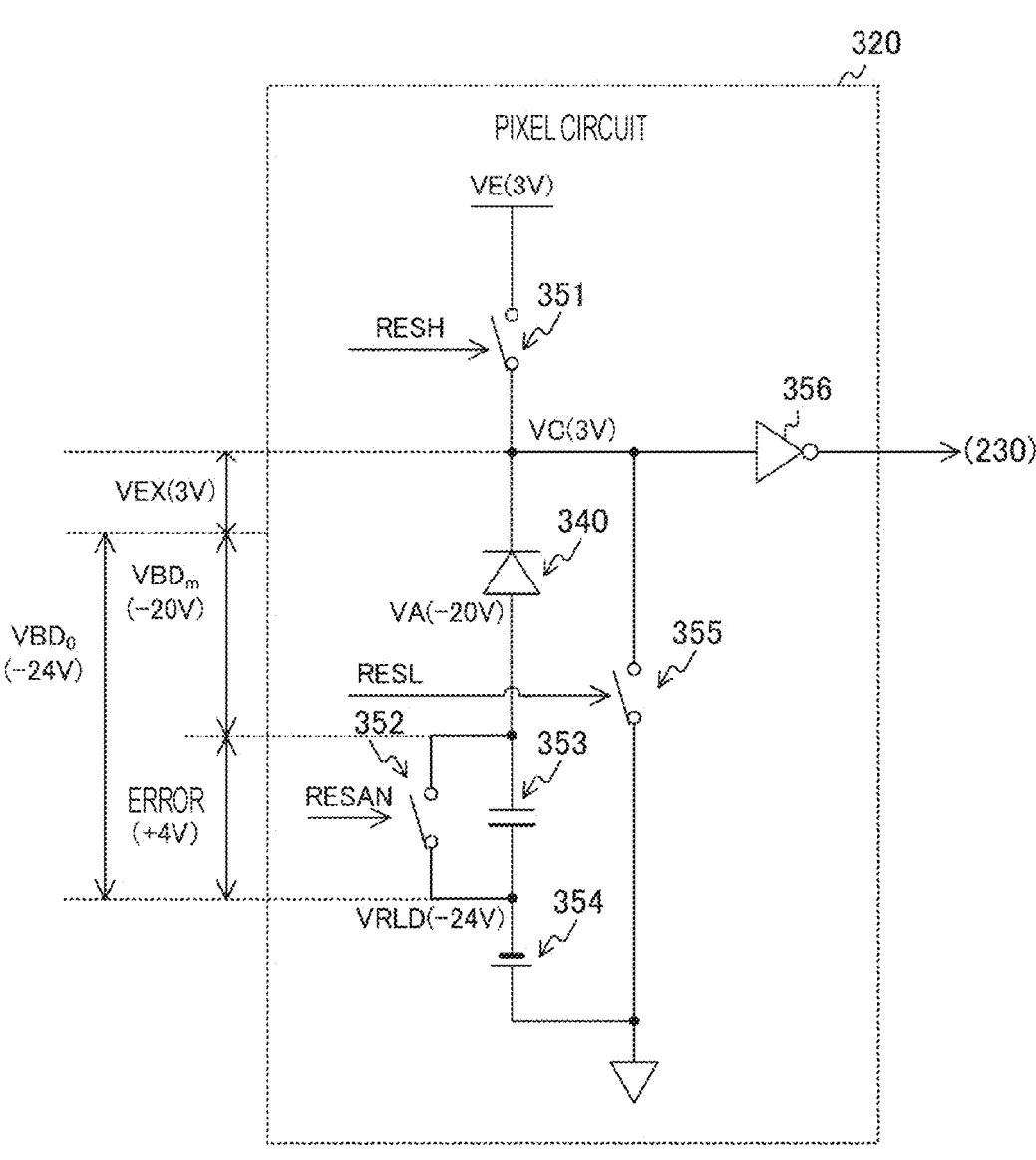
FIG. 35 is a circuit diagram illustrating an example of the pixel circuit in a standby state in the second embodiment of the present technology.

FIG. 35 is a circuit diagram illustrating an example of the pixel circuit 320 in a standby state in the second embodiment of the present technology. FIG. 35 illustrates a state of the pixel circuit 320 at the timing T16 of FIG. 29.

At the timing T16, the control circuit 221 controls the power reset switch 351 to be an opened state using a power reset signal RESH. The pixel circuit 320 shifts to a state in which a photon is awaited to be incident (that is, the Geiger mode).

Figure 36:
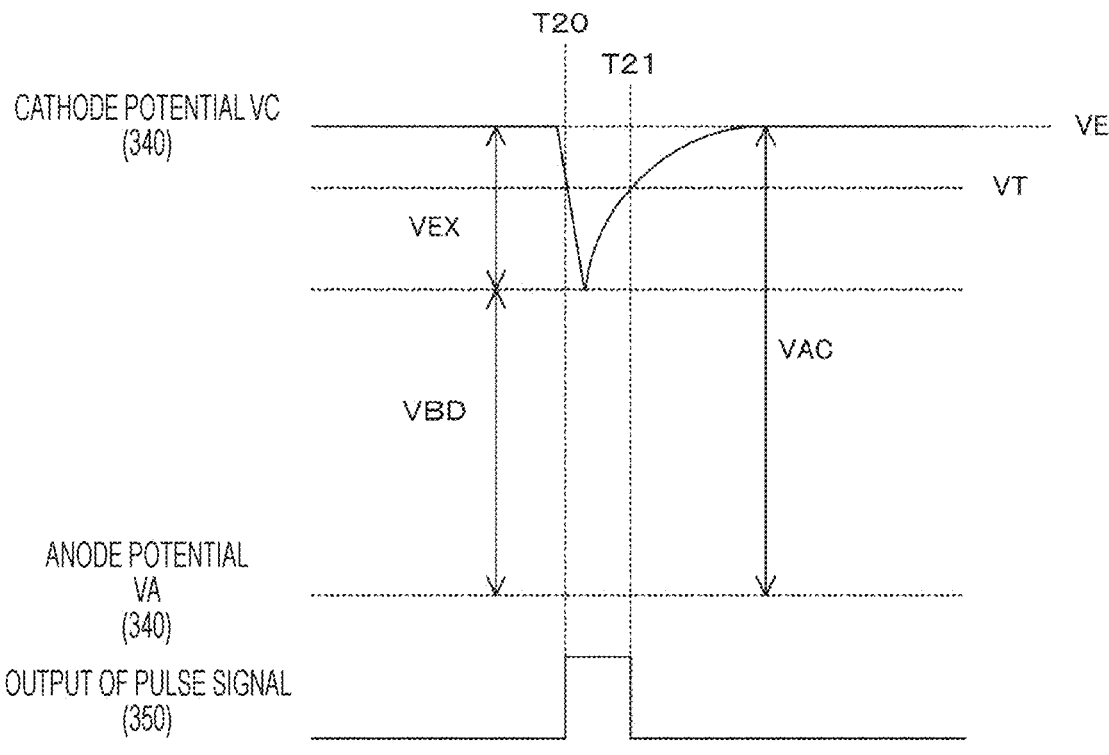
FIG. 36 is a timing chart illustrating an example of fluctuations in cathode potential and pulse signal in the second embodiment of the present technology.

FIG. 36 is a timing chart illustrating an example of fluctuations in cathode potential and pulse signal in the second embodiment of the present technology. In the Geiger mode, a reverse bias voltage VAC, which corresponds to a difference between the breakdown voltage VBD and the excess bias voltage VEX, is applied between the anode and the cathode of the SPAD 340.

When a photon is incident immediately before timing T20, an avalanche breakdown occurs in the SPAD 340, and the cathode potential VC drops. When the cathode potential VC becomes equal to or smaller than a threshold value VT at the timing T20, the detection circuit 350 outputs a high-level pulse signal PDET. Then, when the cathode potential VC rises by recharging and exceeds the threshold value VT at timing T21, the detection circuit 350 returns the pulse signal PDET to the low level.

Figure 37:
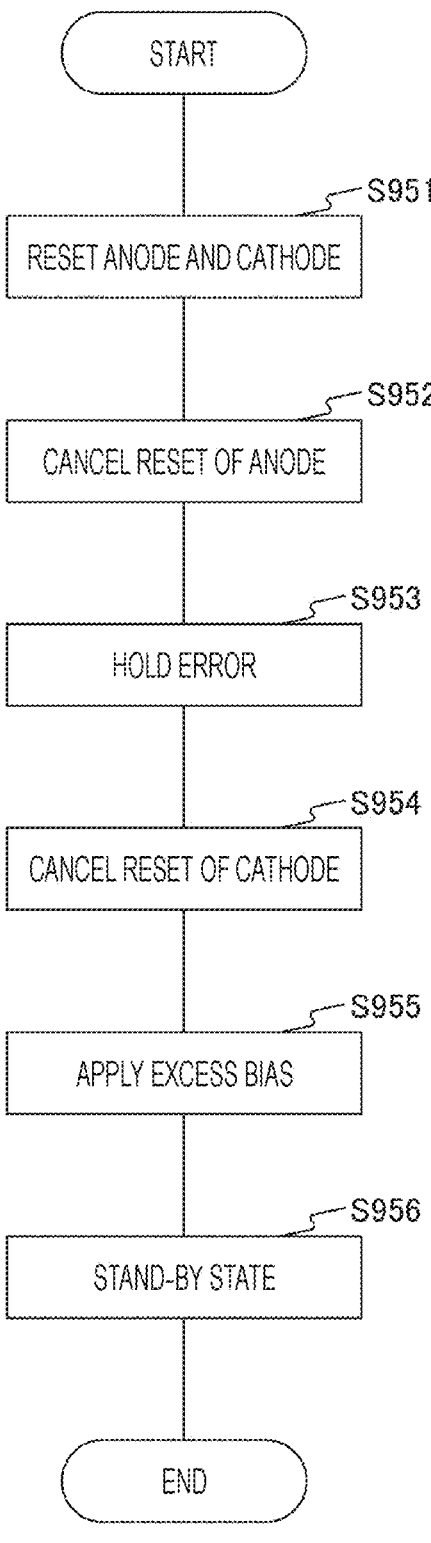
FIG. 37 is a flowchart illustrating an example of an operation of the solid-state imaging element in the first embodiment of the present technology.

FIG. 37 is a flowchart illustrating an example of an operation of the solid-state imaging element in the first embodiment of the present technology. This operation is started, for example, before the shift to the Geiger mode.

First, the control circuit 221 controls both the anode reset switch 352 and the cathode reset switch 355 to be a closed state to initializes potentials of the anode and the reset (step S951).

The control circuit 221 controls the anode reset switch 352 to be an opened state to cancel the reset of the anode (step S952).

Then, when light is incident, the capacitor 353 holds an error of a breakdown voltage $VBD_m$ (step S953).

The control circuit 221 controls the cathode reset switch 355 to be an opened state to cancel the reset of the cathode (step S954). The control circuit 221 controls the power reset switch 351 to be a closed state to apply an excess bias voltage VEX (step S955). The control circuit 221 controls the power reset switch 351 to be an opened state to shift to a standby state for a photon (Geiger mode) (step S956). After the step S956, a distance image is captured, and the solid-state imaging element 200 ends the operation for capturing the distance image.

Note that the first embodiment and any of the first to fifth modifications of the first embodiment can be applied to the second embodiment. By adjusting an individual bias potential for each pixel, it is possible to further improve accuracy in correcting a variation in PDE.

As described above, in the second embodiment of the present technology, since the control circuit 221 performs control to hold an error of the breakdown voltage $VBD_m$ in the capacitor 353 and apply a potential corresponding to the error to the anode, a reverse bias voltage can be adjusted to a value corresponding to the breakdown voltage $VBD_m$. As a result, shading noise caused by variations in breakdown voltage can be suppressed, and the variation in distance measurement accuracy in a distance image can be reduced.

3. Application Example to Mobile Body

The technology according to the present disclosure (the present technology) can be applied to various products. For example, the technology according to the present disclosure may be achieved as a device mounted on any type of mobile body such as a vehicle, an electric vehicle, a hybrid electric vehicle, a motorcycle, a bicycle, a personal mobility, an airplane, a drone, a ship, or a robot.

FIG. 38 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 38, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 38, an audio speaker 12061, a display section 12062, and an instrument panel 12063 are illustrated as the output device. The display section 12062 may, for example, include at least one of an on-board display and a head-up display.

Figure 39:
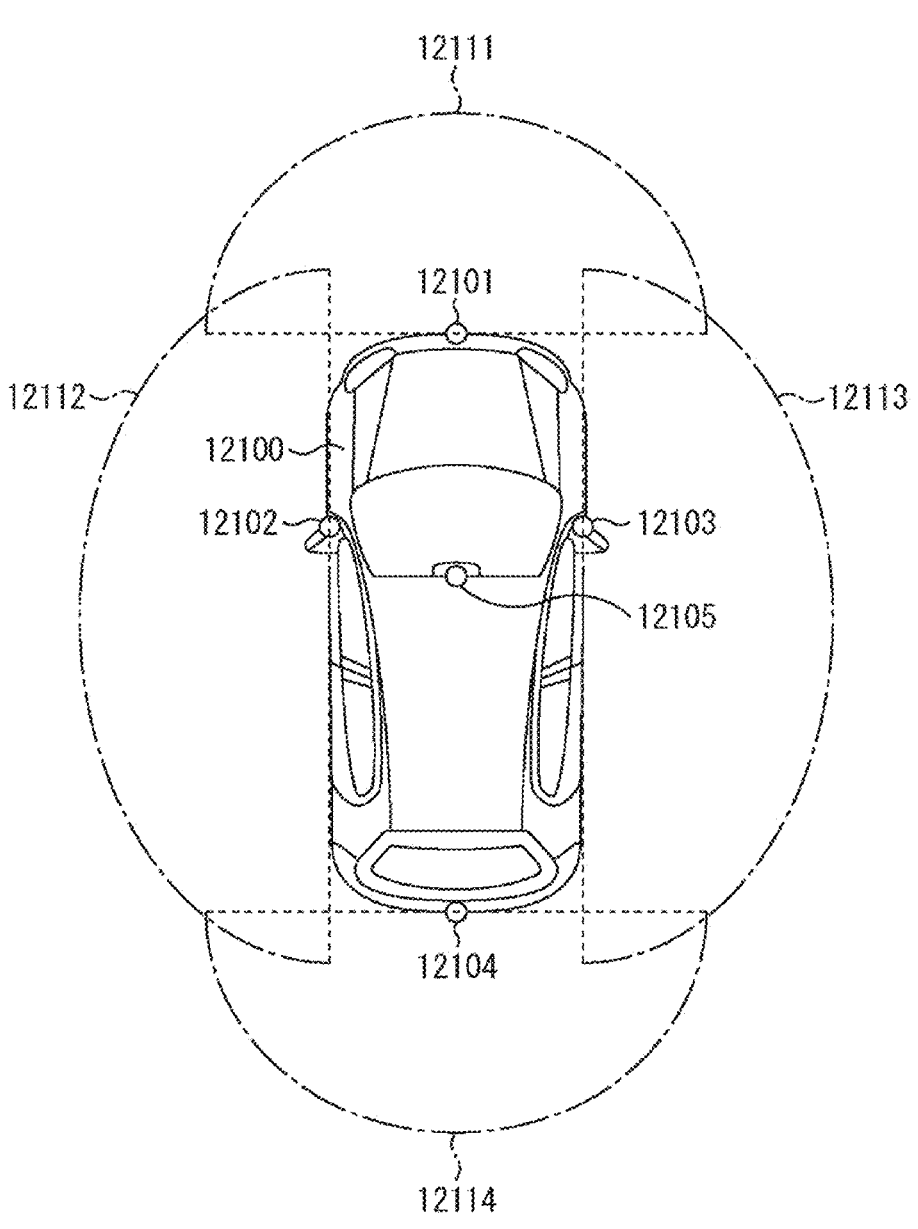
FIG. 39 is a diagram depicting an example of an installation position of an imaging section.

FIG. 39 is a diagram depicting an example of the installation position of the imaging section 12031.

In FIG. 39, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 39 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure can be applied to the outside-vehicle information detecting unit 12030 among the components described above. Specifically, the distance measuring module 100 of FIG. 1 can be applied to the outside-vehicle information detecting unit 12030. By applying the technology according to the present disclosure to the outside-vehicle information detecting unit 12030, shading noise can be suppressed, and the variation in distance measurement accuracy in a distance image can be reduced.

Note that the above-described embodiments describe examples for embodying the present technology, and the matters in the embodiments and the matters specifying the invention in the claims have a correspondence relationship, respectively. Similarly, the matters specifying the invention in the claims and the matters in the embodiments of the present technology denoted by the same terms as the matters specifying the invention have a correspondence relationship, respectively. However, the present technology is not limited to the embodiments, and can be embodied by making various modifications to the embodiments without departing from the gist thereof.

Note that the effects described in the present specification are merely examples and are not restrictive, and there may be other effects as well.

Note that the present technology can also have the following configurations.

(1) A sensing device, including:

a predetermined number of pixel circuits each including a photoelectric conversion element to which a predetermined reverse bias voltage is applied between an anode and a cathode thereof, and a detection circuit that detects whether a photon is present or absent on the basis of a potential of either the anode or the cathode; and a voltage control unit that adjusts the reverse bias voltage to a value corresponding to a breakdown voltage of the photoelectric conversion element for each of the pixel circuits.

(2) The sensing device according to (1), in which the voltage control unit includes a predetermined number of individual bias circuits connected to the different pixel circuits, respectively, to each supply a predetermined individual bias potential to one of the anode and the cathode.

(3) The sensing device according to (2), in which the voltage control unit further includes a common bias circuit connected commonly to the predetermined number of pixel circuits to supply a predetermined common bias potential to another one of the anode and the cathode.

(4) The sensing device according to (2) or (3), in which the individual bias circuit supplies the individual bias potential to the cathode.

(5) The sensing device according to (2) or (3), in which the individual bias circuit supplies the individual bias potential to the anode.

(6) The sensing device according to any one of (2) to (5), in which the pixel circuit and the individual bias circuit are arranged in each of a predetermined number of pixels.

(7) The sensing device according to any one of (2) to (5), in which the predetermined number of pixel circuits are dispersedly arranged in a plurality of pixel blocks, and the individual bias circuit is arranged in each of the plurality of pixel blocks.

(8) The sensing device according to any one of (2) to (5), in which the predetermined number of pixel circuits are dispersedly arranged in a plurality of lines, and the individual bias circuit is arranged in each of the plurality of lines.

(9) The sensing device according to (8), in which the individual bias circuit is arranged at a position where heat distribution is not biased in a pixel array unit.

(10) The sensing device according to any one of (2) to (9), further including a voltage dividing resistor network in which a predetermined number of nodes are connected to each other via resistors, in which the predetermined number of nodes are connected to the different individual bias circuits, respectively, and each of the individual bias circuits supplies the individual bias voltage corresponding to a reference voltage that is a voltage of each of the nodes connected thereto.

(11) The sensing device according to (10), further including:

a measurement value storage unit that stores a measurement value of the breakdown voltage of the photoelectric conversion element for each of the pixel circuits; and a setting unit that sets the reference voltage on the basis of the measurement value.

(12) The sensing device according to (1), in which the voltage control unit performs control to hold an error of the breakdown voltage with respect to a target value for each of the pixel circuits in the detection circuit, and apply a potential corresponding to the error to the anode.

(13) The sensing device according to (12), in which the detection circuit includes:

a power reset switch that opens or closes a path between the cathode and a power potential;

a capacitor inserted between the anode and a low potential lower than a predetermined reference potential;

an anode reset switch that opens or closes a path between both ends of the capacitor;

a cathode reset switch that opens or closes a path between the cathode and the reference potential; and a logic gate that generates a pulse signal on the basis of a potential of the cathode.

(14) The sensing device according to (13), in which the voltage control unit sequentially performs reset control of bringing the power reset switch into an opened state and bringing the anode reset switch and the cathode reset switch into a closed state, holding control of bringing the power reset switch and the anode reset switch into a closed state and bringing the cathode reset switch into an opened state to hold the error in the capacitor, and bias control of bringing the power reset switch into a closed state and bringing the anode reset switch and the cathode reset switch into an opened state to supply an excess bias to the cathode.

(15) An electronic device, including:

a light emitting unit that supplies predetermined irradiation light;

a predetermined number of pixel circuits each including a photoelectric conversion element to which a predetermined reverse bias voltage is applied between an anode and a cathode thereof, and a detection circuit that detects whether a photon is present or absent in reflected light with respect to the irradiation light on the basis of a potential of either the anode or the cathode; and a voltage control unit that adjusts the reverse bias voltage to a value corresponding to a breakdown voltage of the photoelectric conversion element for each of the pixel circuits.

(16) A sensing device, including:

a first pixel circuit including a first photoelectric conversion element, and a first detection circuit that detects whether a photon is present or absent on the basis of a potential of either an anode or a cathode of the first photoelectric conversion element;

a second pixel circuit including a second photoelectric conversion element and a first detection circuit that detects whether a photon is present or absent on the basis of a potential of either an anode or a cathode of the second photoelectric conversion element;

a first bias circuit connected to either the anode or the cathode of the first photoelectric conversion element;

a second bias circuit connected to either the anode or the cathode of the second photoelectric conversion element; and a reference voltage supply unit that supplies different reference voltages to the first and second bias circuits, respectively, to supply the potentials corresponding to the respective reference voltages.

REFERENCE SIGNS LIST

100 Distance measuring module
110 Light emitting unit
120 Synchronization control unit
200 Solid-state imaging element
201 Pixel chip
202 Circuit chip
210 Reference voltage supply unit
211 Resistor
221 Control circuit
222 Pixel array unit
223 Measurement value storage unit
224 Bias voltage setting unit
230 Signal processing unit
231 TDC
232 Distance data generation unit
240 Common bias circuit
241, 313 Current source
242 nMOS transistor
243, 311 Operational amplifier
300 Pixel
305 Voltage control unit
306 Pixel block
310 Individual bias circuit
312 pMOS transistor
320 Pixel circuit
330, 350 Detection circuit
331 Drive transistor
332 Logic gate
340 SPAD
341 Switch
342 Internal resistor
343 Breakdown voltage supply unit
351 Power reset switch
352 Anode reset switch
353 Capacitor
354 Low potential supply unit
355 Cathode reset switch
356 Inverter

The invention claimed is:

1. A sensing device, comprising:
a predetermined number of pixel circuits each including a photoelectric conversion element to which a predetermined reverse bias voltage is applied between an anode and a cathode thereof, and a detection circuit that detects whether a photon is present or absent on a basis of a potential of either the anode or the cathode; and
a voltage control unit that adjusts the predetermined reverse bias voltage to a value corresponding to a breakdown voltage of the photoelectric conversion element for each of the predetermined number of pixel circuits; wherein the voltage control unit performs control to hold an error of the breakdown voltage with respect to a target value for each of the predetermined number of pixel circuits in the detection circuit, and apply a potential corresponding to the error to the anode; and
wherein the detection circuit includes: a power reset switch that opens or closes a path between the cathode and a power potential; a capacitor inserted between the anode and a low potential lower than a predetermined reference potential; an anode reset switch that opens or closes a path between both ends of the capacitor; a cathode reset switch that opens or closes a path between the cathode and the predetermined reference potential; and a logic gate that generates a pulse signal on a basis of a potential of the cathode.

2. The sensing device according to claim 1, wherein the voltage control unit includes a predetermined number of individual bias circuits connected to different pixel circuits of the predetermined number of pixel circuits, respectively, to each supply a predetermined individual bias potential to one of the anode or the cathode.

3. The sensing device according to claim 2, wherein the voltage control unit further includes a common bias circuit connected commonly to the predetermined number of pixel circuits to supply a predetermined common bias potential to remaining of the one of the anode or the cathode.

4. The sensing device according to claim 2, wherein an individual bias circuit of the predetermined number of individual bias circuits supplies the predetermined individual bias potential to the cathode.

5. The sensing device according to claim 2, wherein an individual bias circuit of the predetermined number of individual bias circuits supplies the predetermined individual bias potential to the anode.

6. The sensing device according to claim 2, wherein a respective pixel circuit of the predetermined number of pixel circuits and a respective individual bias circuit of the predetermined number of individual bias circuits are arranged in each of a predetermined number of pixels.

7. The sensing device according to claim 2, wherein the predetermined number of pixel circuits are dispersedly arranged in a plurality of pixel blocks, and a respective individual bias circuit of the predetermined number of individual bias circuits is arranged in each of the plurality of pixel blocks.

8. The sensing device according to claim 2, wherein the predetermined number of pixel circuits are dispersedly arranged in a plurality of lines, and a respective individual bias circuit of the predetermined number of individual bias circuits is arranged in each of the plurality of lines.

9. The sensing device according to claim 8, wherein the respective individual bias circuit is arranged at a position where heat distribution is not biased in a pixel array unit.

10. The sensing device according to claim 2, further comprising a voltage dividing resistor network in which a predetermined number of nodes are connected to each other via resistors, wherein the predetermined number of nodes are connected to different individual bias circuits of the predetermined number of individual bias circuits, respectively, and each of the predetermined number of individual bias circuits supplies an individual bias voltage corresponding to a reference voltage that is a voltage of each of the predetermined number of nodes connected thereto.

11. The sensing device according to claim 10, further comprising:
a measurement value storage unit that stores a measurement value of the breakdown voltage of the photoelectric conversion element for each of the predetermined number of pixel circuits; and
a setting unit that sets the reference voltage on a basis of the measurement value.

12. The sensing device according to claim 1, wherein the voltage control unit sequentially performs reset control of bringing the power reset switch into an opened state and bringing the anode reset switch and the cathode reset switch into a closed state, holding control of bringing the power reset switch and the anode reset switch into the closed state and bringing the cathode reset switch into the opened state to hold the error in the capacitor, and bias control of bringing the power reset switch into the closed state and bringing the anode reset switch and the cathode reset switch into the opened state to supply an excess bias to the cathode.

13. An electronic device, comprising:

a light emitting unit that supplies predetermined irradiation light;

a predetermined number of pixel circuits each including a photoelectric conversion element to which a predetermined reverse bias voltage is applied between an anode and a cathode thereof, and a detection circuit that detects whether a photon is present or absent in reflected light with respect to the predetermined irradiation light on a basis of a potential of either the anode or the cathode; and a voltage control unit that adjusts the predetermined reverse bias voltage to a value corresponding to a breakdown voltage of the photoelectric conversion element for each of the predetermined number of pixel circuits; wherein the voltage control unit performs control to hold an error of the breakdown voltage with respect to a target value for each of the predetermined number of pixel circuits in the detection circuit, and apply a potential corresponding to the error to the anode; and wherein the detection circuit includes: a power reset switch that opens or closes a path between the cathode and a power potential; a capacitor inserted between the anode and a low potential lower than a predetermined reference potential; an anode reset switch that opens or closes a path between both ends of the capacitor; a cathode reset switch that opens or closes a path between the cathode and the predetermined reference potential; and a logic gate that generates a pulse signal on a basis of a potential of the cathode.

14. A sensing device, comprising:

a first pixel circuit including a first photoelectric conversion element, and a first detection circuit that detects whether a photon is present or absent on a basis of a potential of either an anode or a cathode of the first photoelectric conversion element;

a second pixel circuit including a second photoelectric conversion element and a second detection circuit that detects whether a photon is present or absent on a basis of a potential of either an anode or a cathode of the second photoelectric conversion element;

a first bias circuit connected to either the anode or the cathode of the first photoelectric conversion element;

a second bias circuit connected to either the anode or the cathode of the second photoelectric conversion element; and a reference voltage supply unit that supplies different reference voltages to the first bias circuit and the second bias circuit, respectively, to supply potentials corresponding to the different reference voltage; wherein a voltage control unit performs control to hold an error of a breakdown voltage with respect to a target value for the first pixel circuit in the first detection circuit, and apply a potential corresponding to the error to the anode of the first photoelectric conversion element; and wherein the first detection circuit and the second detection circuit include: a power reset switch that opens or closes a path between the cathode and a power potential; a capacitor inserted between the anode and a low potential lower than a predetermined reference potential; an anode reset switch that opens or closes a path between both ends of the capacitor; a cathode reset switch that opens or closes a path between the cathode and the predetermined reference potential; and a logic gate that generates a pulse signal on a basis of a potential of the cathode.

* * * * *